United States Patent
Ramirez Solorzano et al.

(10) Patent No.: US 12,254,566 B2
(45) Date of Patent: Mar. 18, 2025

(54) METHOD FOR ANALYZING USER INPUT REGARDING 3D OBJECT, DEVICE, AND NON-TRANSITORY COMPUTER-READABLE RECORDING MEDIUM

(71) Applicant: Mawari Corp., Los Altos, CA (US)

(72) Inventors: Luis Oscar Ramirez Solorzano, Tokyo (JP); Aleksandr Mikhailovich Borisov, Tyumen (RU)

(73) Assignee: Mawari Corp, Los Altos, CA (US)

(*) Notice: Subject to any disclaimer, the term of this patent is extended or adjusted under 35 U.S.C. 154(b) by 0 days.

(21) Appl. No.: 18/549,431

(22) PCT Filed: Mar. 8, 2022

(86) PCT No.: PCT/JP2022/010053
§ 371 (c)(1),
(2) Date: Sep. 7, 2023

(87) PCT Pub. No.: WO2022/191200
PCT Pub. Date: Sep. 15, 2022

(65) Prior Publication Data
US 2024/0169595 A1   May 23, 2024

(30) Foreign Application Priority Data
Mar. 9, 2021   (JP) .................. 2021-037507

(51) Int. Cl.
*G06F 3/0481*   (2022.01)
*G06F 3/01*   (2006.01)
(Continued)

(52) U.S. Cl.
CPC .............. *G06T 17/00* (2013.01); *G06F 3/011* (2013.01); *G06T 7/50* (2017.01); *G06T 7/60* (2013.01);
(Continued)

(58) Field of Classification Search
None
See application file for complete search history.

(56) References Cited

U.S. PATENT DOCUMENTS

2010/0134494 A1   6/2010   Lim
2019/0069000 A1   2/2019   Hou
(Continued)

FOREIGN PATENT DOCUMENTS

JP   09-200599 A   7/1997
JP   2005-259097 A   9/2005
(Continued)

OTHER PUBLICATIONS

International Search Report from International Application No. PCT/JP2022/010053 mailed May 24, 2022.
Extended European Search Report dated Jan. 8, 2025.

*Primary Examiner* — Carl Adams
(74) *Attorney, Agent, or Firm* — Shih IP Law Group, PLLC.

(57) ABSTRACT

The present disclosure provides a method for analyzing an input by a user received by a client on a server; the method comprising of; sending a content to be displayed by the client from the server to the client; receiving from the client, an input information by the user to the client during the content is displayed; analyzing the input information by the user received from the client; and changing the content to be displayed by the client based on the result of the analysis; and sending the changed content to the client.

11 Claims, 39 Drawing Sheets

(51) Int. Cl.
*G06T 7/50* (2017.01)
*G06T 7/60* (2017.01)
*G06T 7/90* (2017.01)
*G06T 9/00* (2006.01)
*G06T 15/04* (2011.01)
*G06T 15/20* (2011.01)
*G06T 15/50* (2011.01)
*G06T 17/00* (2006.01)
*G06T 19/00* (2011.01)
*G06V 10/56* (2022.01)
*H04N 19/597* (2014.01)
*H04L 65/70* (2022.01)

(52) U.S. Cl.
CPC ............... *G06T 7/90* (2017.01); *G06T 9/00* (2013.01); *G06T 9/001* (2013.01); *G06T 15/04* (2013.01); *G06T 15/20* (2013.01); *G06T 15/503* (2013.01); *G06T 19/00* (2013.01); *G06V 10/56* (2022.01); *H04N 19/597* (2014.11); *G06T 2207/10024* (2013.01); *G06T 2207/10028* (2013.01); *G06T 2210/08* (2013.01); *H04L 65/70* (2022.05)

(56) References Cited

U.S. PATENT DOCUMENTS

| 2020/0005361 A1* | 1/2020 | Zeiger .................. G06T 15/503 |
| 2020/0258299 A1 | 8/2020 | Kobayashi |
| 2021/0142551 A1 | 5/2021 | Kobayashi |
| 2022/0368751 A1 | 11/2022 | Oh |

FOREIGN PATENT DOCUMENTS

| JP | 2009-140109 A | 6/2009 |
| JP | 2014-219739 A | 11/2014 |
| JP | 2019-046077 A | 3/2019 |
| JP | 2020-536300 A | 12/2020 |
| WO | 2019003953 A1 | 1/2019 |
| WO | 2019039282 A1 | 2/2019 |
| WO | 2019067687 A | 4/2019 |
| WO | 2020149270 A1 | 7/2020 |
| WO | 2021002592 A1 | 1/2021 |

* cited by examiner

FIG. 16

| Event ID | Event Name |
|---|---|
| OT001 | rotate object - start |
| OT002 | rotate object - stop |
| OT003 | door open |
| OT004 | door close |
| OT005 | change product model |
| OT006 | change view (interior to exterior for example) |
| OT007 | POI focus |
| OT008 | object zoom start |
| OT009 | object zoom stop |
| OT010 | other (custom) |
| OT011 | change wheels |
| OT012 | turn on / off lights |
| OT013 | change alignment |
| OT014 | object scale start |
| OT015 | object scale stop |
| OT016 | object mirror |
| ... | ... |

| Event ID | Event Name |
|---|---|
| CT001 | object distance change - start |
| CT002 | object distance change - stop |
| CT003 | object direction change - start |
| CT004 | object direction change - stop |
| CT005 | object location change - start |
| CT006 | object location change - stop |
| CT007 | zoom object view - start |
| CT008 | zoom object view - stop |
| CT009 | camera rotation - start |
| CT010 | camera rotation - stop |
| CT011 | projection matrix change |
| ... | ... |

| Event Name | Event ID |
|---|---|
| change body color | OP001 |
| change trim color | OP002 |
| change body texture | OP003 |
| change background | OP004 |
| change object graphics | OP005 |
| change object multimedia | OP006 |
| start object animation | OP007 |
| stop object animation | OP008 |
| change object animation | OP009 |
| start background animation | OP010 |
| stop background animation | OP011 |
| change background animation | OP012 |
| ... | ... |

FIG. 21C

| Event ID | Event Name |
|---|---|
| S001 | AR System loaded |
| S002 | Assets loaded |
| S003 | scene ready |
| S004 | spawn object |
| S005 | spawn multiple objects (how many) |
| S006 | error (AR system) |
| S007 | timer-after-action (how much time) |
| S008 | timer-after-impression (how much time) |
| S009 | photo / screenshot taken |
| S010 | Call to Action |
| S011 | reset creative |
| S012 | launch AR mode |
| S013 | start (video / audio multimedia) |
| S014 | stop (video / audio multimedia) |
| S015 | resume (video / audio multimedia) |
| S016 | mediaQuartileComplete (video / audio multimedia - 1,2,3,4 quarters |
| S017 | volume change (audio) |
| ... | ... |

FIG. 21E

| Event ID | S001 | S004 | OT003 | OT001 | OT002 | M002 | CP004 | CT009 | CT010 | ... |
|---|---|---|---|---|---|---|---|---|---|---|
| Time | t1 | t2 | t3 | t4 | t5 | t6 | t7 | t8 | t9 | ... |

METHOD FOR ANALYZING USER INPUT REGARDING 3D OBJECT, DEVICE, AND NON-TRANSITORY COMPUTER-READABLE RECORDING MEDIUM

TECHNICAL FIELD

This disclosure relates to a method, an apparatus, and a program for analyzing user input regarding 3D (three-dimensional).

BACKGROUND ART

Conventionally, techniques of transmitting a 3D image from a server to a client and displaying the image on a client have been available, but those techniques use, for example, a technique of converting a 3D image into a two-dimensional (2D) image on the server side (see, Patent Literature (hereinafter, abbreviated as PTL) 1).

As another conventional technique, there has been proposed an information processing apparatus that incorporates and displays a three-dimensional computer graphic in a banner advertisement such that the three-dimensional computer graphic is operable (see, e.g., Patent Literature 2).

The information processing apparatus disclosed in PTL 2 displays, in a web page of the Internet, a banner advertisement incorporating a three-dimensional computer graphic, and moves, rotates, scales, changes the shape of, changes the texture of, and animates the three-dimensional computer graphic in the banner advertisement interactively in accordance with a user's operation.

Further, an information processing apparatus disclosed in PTL 3 displays image information such that the image information is scalable and the position of the displayed image information is movable. When a user browses the image information, the information processing apparatus records, as use information, information identifying the user, an operational content, center coordinates of the image information displayed on a screen, and the time at which the operation was performed. The information processing apparatus cumulatively records and analyzes the use information, so as to analyze how long the user displayed each portion of a displayed image.

CITATION LIST

Patent Literature

PTL 1
 U.S. Patent Application Publication No. 2010/0134494
PTL 2
 Japanese Patent Application Laid-Open No. 2005-259097
PTL 3
 Japanese Patent Application Laid-Open No. 2009-140109

SUMMARY OF INVENTION

Technical Problem

An object of the present invention is to provide an event analysis program, an information processing apparatus, and a system that analyze, based on an operational content, an interest, a behavioral tendency, and the like of a user with respect to content displayed so as to be operable by the user.

Another conventional problem to be solved is to reduce the bandwidth used for data transmission while maintaining the image quality in 3D image transmission.

Solution to Problem

A method according to one aspect of the present disclosure is a method for analyzing an input by a user received by a client on a server: the method comprising of: sending a content to be displayed by the client from the server to the client: receiving from the client, an input information by the user to the client during the content is displayed: analyzing the input information by the user received from the client; and changing the content to be displayed by the client based on the result of the analysis; and sending the changed content to the client.

A method according to one aspect of the present disclosure is wherein the content further includes 3D objects, when the server transmits the 3D object to the client, the server extracts color information, alpha information, and geometry information from the 3D object, simplifies the geometry information, and encodes the color information, the alpha information, and the simplified geometry information to the client as a stream.

A server according to one aspect of the present disclosure is server analyzes an input by user received by a client, on a server, wherein the server includes one or more processors and memory, the server is configured to send the content to be displayed by the client from the server to the client, receive the user's input information for the client displaying the content from the client: analyze the input information by the user received from the client; and change the content to be displayed on the client based on the result of the analysis; and send the changed content to the client.

A method according to one aspect of the present disclosure a method to display content on a client, wherein the content includes content received from a server, the method comprising of: receiving from the server, the content to be displayed by the client: sending the user input information to the client while displaying the content to the server; and receiving the content changed based on the result of analysis on the server for the input information; and displaying the changed content on the client.

A client according to one aspect of the present disclosure is a client displays content, wherein the content includes content received from a server: wherein the client includes one or more processors and a memory: the client is configured to receive the content to be displayed by the client from the server: send the user's input information for the client during displaying the content to the server: receive the content changed based on the result of analysis on the server for the input information; and display the changed content on the client.

A computer program according to one aspect of the present disclosure includes: instructions by a processor to execute the method according to any one of the above mentioned methods.

Advantageous Effects of Invention

The advantages and effects in one embodiment of the disclosure will be apparent from the specification and drawings. While such advantages and/or effects are provided by the features described in the several embodiments and specification and drawings, respectively, all of them need not be provided to obtain one or more of the same features.

Although a description will be hereinafter given with transmission of 3D images (including moving images and/or still images) between a server and a client as an example for illustration purposes, the application of this disclosure is not limited to a client-server system and may be applied to the transmission from one computer to another computer or multiple computers.

BRIEF DESCRIPTION OF DRAWINGS

FIG. 16 is a diagram showing a pixel configuration in an ARGB system used in the disclosure.

FIG. 21A is an explanatory view for explaining exemplary items of events;

FIG. 21B is an explanatory view for explaining exemplary items of events;

FIG. 21C is an explanatory view for explaining exemplary items of events;

FIG. 21E is an explanatory view for explaining exemplary items of events;

FIG. 22 illustrates a configuration example of event history information;

DESCRIPTION OF EMBODIMENTS

Example 1

1. 3D Streaming System architecture

Figure 1:
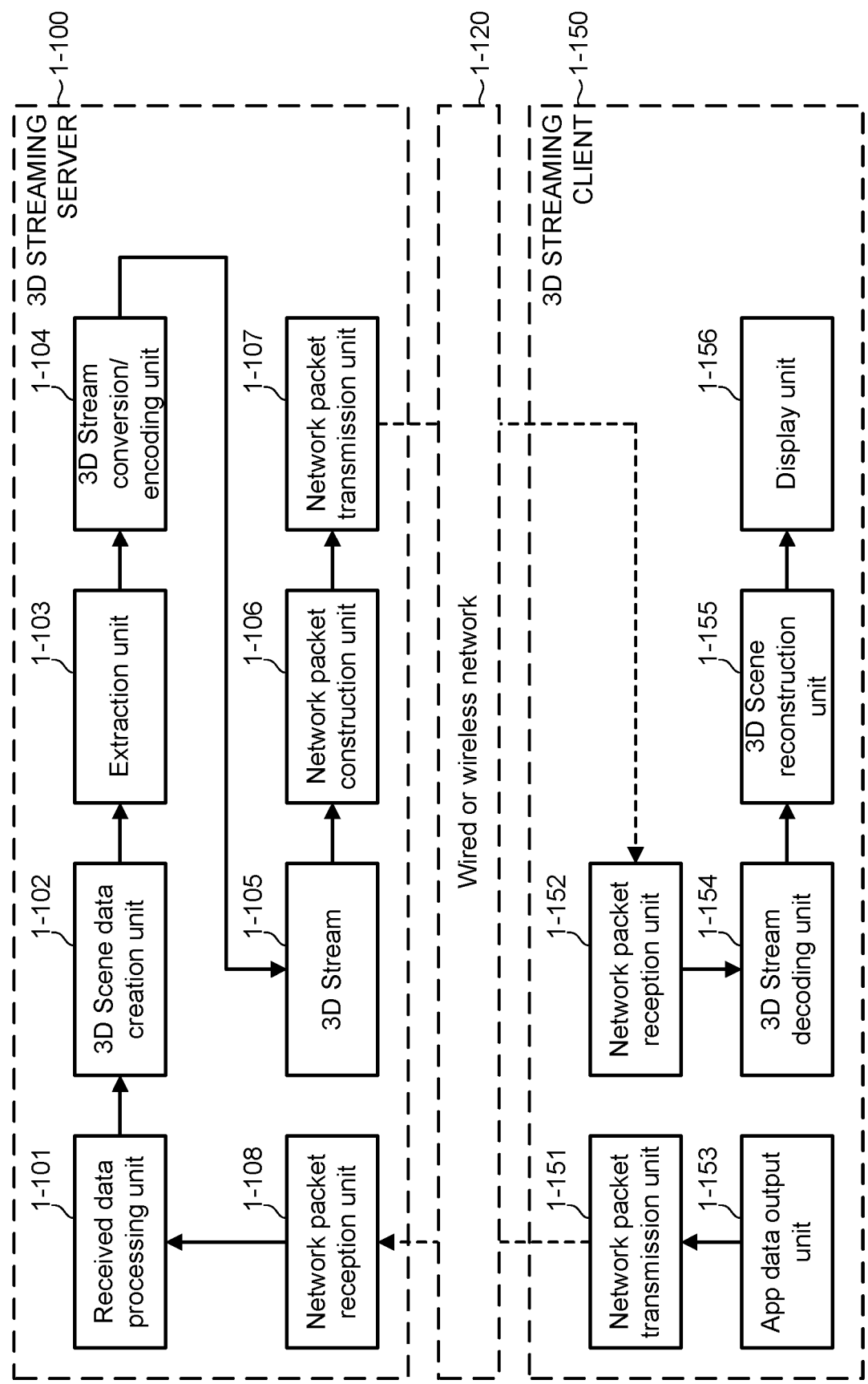
FIG. 1 is a functional block diagram of a server and a client according to this disclosure.

FIG. 1 is a functional block diagram of a server and a client according to the disclosure. 3D streaming server 1-100 includes a functional configuration within a three-dimensional (3D) streaming server, and 3D streaming client 1-150 includes a functional configuration within a streaming client. Network 1-120 represents a wired or wireless network between server 1-100 and client 1-150.

One system subject to the disclosure generates 3D images on the server side, and reconstructs 3D images on the basis of the features of 3D images received from the server and displays the 3D images on the client side. As the client device, any device having a display function and a communication function, such as a smartphone, a cell phone, a tablet, a laptop computer, a smart glass or smart glasses, a head-mounted display, a headset, or the like, is suitable for the disclosure. Herein the amount of characteristic (may be referred to as feature quantity, feature value, feature amount, or feature) include color information, alpha information, or geometry information of 3D images.

1.2 3D Streaming Server-Side Processing

The upper half of FIG. 1 is a functional block diagram illustrating a process in 3D streaming server 1-100. Network packet reception unit 1-108 receives packets containing instructions and/or data from client 1-150 via wired or wireless network 120. Network packet reception unit 1-108 extracts the instructions and/or data received from the client from the packet and transmits the extracted data to received data processing unit 1-101, which processes the instructions and/or data from the client. Received data processing unit 1-101, which receives the extracted instructions and/or data from the clients, further extracts the required instructions and/or data from the received data and sends them to 3D scene data creation unit 1-102. Then, 3D scene data creation unit 1-102 processes and modifies the data of 3D scene (or 3D object) corresponding to the request managed by the server from the client in accordance with the request sent from client 1-150. Extraction unit 1-103, which receives the instructions and/or data from 3D scene data creation unit 1-102, then extracts the required data from the updated 3D scene data according to the instructions from the clients and sends them to 3D stream conversion/encoding unit 1-104. 3D stream conversion/encoding unit 1-104 converts the data received from extraction unit 1-103 into a 3D stream and encodes the converted data to generate 3D stream 1-105. 3D stream 1-105 is then sent to network packet construction unit 1-106 and a network packet is generated by network packet construction unit 1-106. The network packets are transmitted to network packet transmission unit 1-107. Network packet transmission unit 1-107 transmits the received network packet to one or more clients 1-150 via wired or wireless network 120.

1.3 3D Streaming Client-Side Processing

The lower half of FIG. 1 is a functional diagram illustrating the process in 3D streaming client 1-150. Network packet reception unit 1-152, which has received the packet from server 1-100 via wired or wireless network 120, extracts the encoded 3D stream from the packet and sends it to 3D stream decoding unit 1-154. 3D stream decoding unit 1-154 that received the encoded 3D stream decodes 3D stream and sends the decoded 3D stream to 3D scene reconstruction unit 1-155. Upon receiving the decoded 3D stream, scene reconstruction unit 1-155 reconstructs 3D scene (or 3D object) from 3D stream received from server 1-100 and sends the reconstructed 3D scene to display unit 1-156. Display unit 1-156 displays and presents the reconstructed 3D scenes to a user.

On the other hand, a 3D display (update) request from 3D streaming client 1-150 is sent from application data output unit 1-153 to network packet transmission unit 1-151. As 3D display (update) request data generated by application data output unit 1-153, for example, user input or camera/device position change or a command for requesting updating the display may be considered. Upon receiving 3D display request, network packet transmission unit 1-151 sends, via wired or wireless network 120, 3D streaming server 1-100 3D display (update) request that has been processed as required, such as encoding and packetization.

Network packet construction unit 1-106 and network packet transmission unit 1-107 included in server 1-100 described above, network packet reception unit 1-152 and network packet transmission unit 1-151 included in client 1-150 described above, may, for example, be modified as required based on the corresponding transmission and reception modules of existing open source software, or may be created exclusively from scratch.

Figure 2:
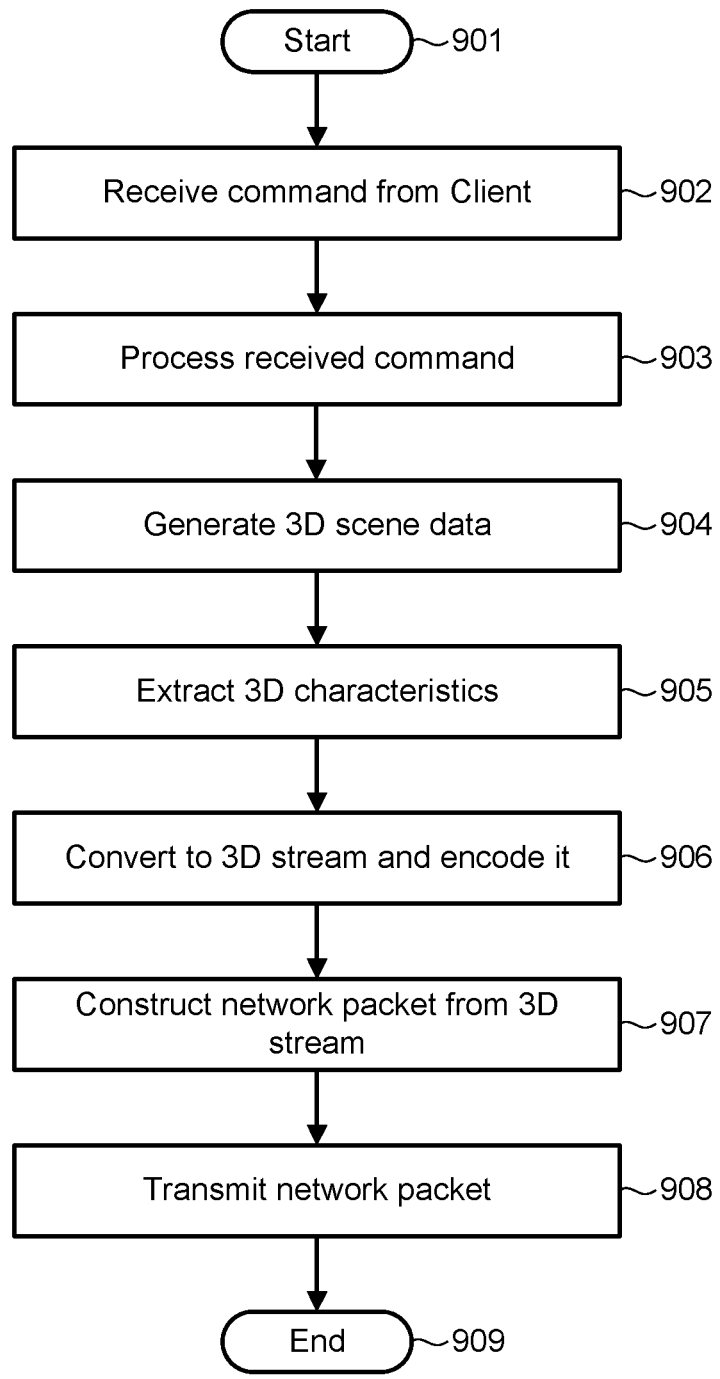
FIG. 2 is a flowchart illustrating the processing on the server side of the data flow between the server and the client described in FIG. 1.

FIG. 2 is a flowchart illustrating processing on the server side of the data flow between the server and the client described in FIG. 1. In step 901, the processing is started. First, network packet reception unit 1-108 described in FIG. 1 receives a packet including a rewrite command of 3D scene from the client in step 902. Next, reception data processing unit 1-101 described in FIG. 1 processes the received command, and outputs the result in step 903. Next, 3D scene data creation unit 1-102 described in FIG. 1 generates 3D scene data according to the received command or the like in step 904. Next, extraction unit 1-103 of FIG. 1 extracts feature amount of 3D scene in step 905. Herein the feature amount refers to data such as geometry, color, metadata, sound, and commands included in the container stream to be described later. Next, 3D stream conversion/encoding unit 1-104 of FIG. 1 converts the data including 3D feature amount into a 3D stream and encodes the converted data in step 906. Next, network packet construction unit 1-106 of FIG. 1 constructs a network packet from the 3D stream in step 907. Next, network packet transmission unit 1-107 of FIG. 1 transmits a network packet in step 908. This terminates a series of server-side data transmission processes in step 909.

In FIG. 2, as an example, the processing of steps 902 to 903 and the processing of steps 904 to 908 are sequentially executed, but the processing of steps 902 to 903 and the processing of steps 904 to 908 may be executed in parallel or may be started from the processing of step 904.

Figure 3:
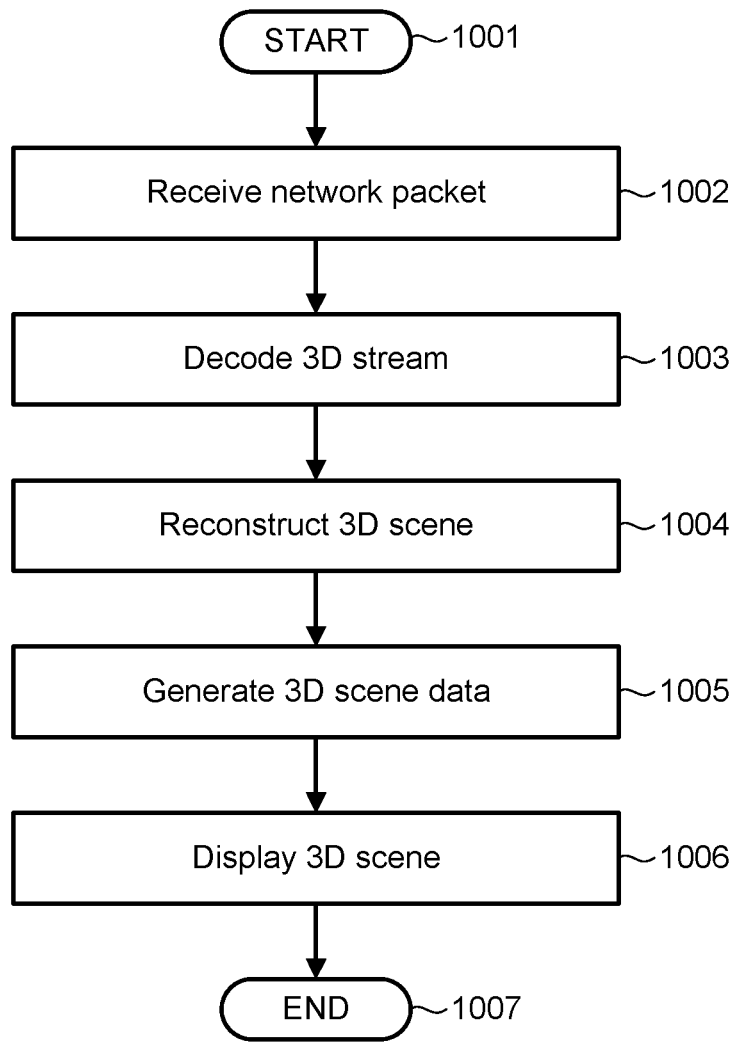
FIG. 3 is a flowchart illustrating the processing of data on the client side of the data flow between the server and the client described in FIG. 1.

FIG. 3 is a flowchart illustrating processing of data on the client side among the data flows between the server and the client described in FIG. 1. In step 1001, the processing is started. First, network packet reception unit 1-152 described in FIG. 1 receives a packet sent from server 1-100 in step 1002. Next, 3D stream decoding unit 1-154 described in FIG. 1 decodes the received packets and extracts the feature amount of 3D scenes. Next, 3D scene reconstruction unit 1-155 described in FIG. 1 reconstructs 3D scene on the clients using feature amount of 3D scene or the like in step 1004, and generates 3D scene data in step 1005. Next, display unit 1-156 described in FIG. 1 displays the reconstructed 3D scenes and presents them to the user in step 1006. This terminates the client-side data processing in step 1007.

In FIG. 3, as an example, the processing of steps 1002 to 1004 and the processing of steps 1005 to 1006 are sequentially executed, but the processing of steps 1002 to 1004 and the processing of steps 1005 to 1006 may be executed in parallel or may be started from the processing of step 1005.

Figure 4:
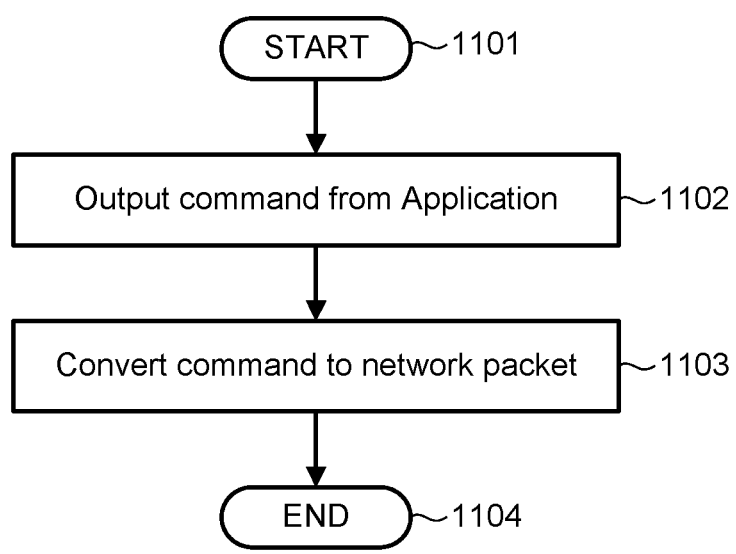
FIG. 4 is a flowchart illustrating processing of a command on the client side of the data flow between the server and the client described in FIG. 1.

FIG. 4 is a flowchart illustrating processing of a command on the client side among the data flows between the server and the client described in FIG. 1. In step 1101, the processing is started. Application data output unit 1-153 described in FIG. 1 outputs commands for rewriting 3D scenes from an image-processing application or the like in step 1102. Network packet transmission unit 1-151 described in FIG. 1 receives a command or the like from application data output unit 1-153, converts it into a packet, and transmits the converted packet to wired or wireless network 120 in step 1103. This terminates the client-side data processing in step 1104.

In FIG. 4, as an example, the processing of step 1102 and the processing of step 1103 are sequentially executed, but the processing of step 1102 and the processing of step 1103 may be executed in parallel.

2. 3D Stream Format According to the Disclosure

The format of 3D streams according to the disclosure is mainly characterized by the following. It is significant to realize these by using limited network bandwidth without degrading 3D images displayed on the client-side.

1) 3D Streaming is Generated on the Server-Side.

When generating 3D streams on the server side, an available engine such as UE4 or Unity is used. Herein UE is a game engine, named "Unreal Engine" developed by Epic Games Inc., and UE 5 was announced in May 2020.

2) Efficient Transmission Over the Network is Supported

Therefore, the amount of data transferred from the server to the client is smaller than that of the conventional method. To accomplish this, a container stream is used for the present disclosure.

3) Operable With a Variety of Devices

The target devices can be, for example, any devices available for a Unity (Android, Windows, iOS), a WebGL, UE4, or UE5 (Android, IOS, Windows).

4) Relatively Light for Modern AR (Augmented Reality) Devices

That is, compared with the conventional method, the processing load on the client side is smaller. This is due to the use of the container stream according to the present disclosure.

5) Interactions (i.e., Two-way Communication) is Supported

That is, the streaming is interactive. This is because commands can be sent and received between the client and the server for both directions.

In order to embody the features described above, the disclosure has developed its own container stream as a 3D stream for transmission between the server and the clients. This proprietary container stream includes some of the following geometry, color, metadata, sound, and command.

1) Geometry: A simplified 3D date of the outline of a streamed object of a 3D scene on a server. The geometry data is, for example, an array of vertices of a polygon used to represent the shape of the object.
2) Color: Color data of an object captured by a camera at a specific position.
3) Metadata: Metadata is data describing 3D scenes, environments, individual objects, data in streams, etc.
4) Sound: Sound is sound (audio) data that occurs in a 3D scene on the server or client side. Sounds can communicate bidirectionally between the server and the client.
5) Command: Command is instructions include server-side or client-side 3D scenes, system events, status messages, camera, user inputs, and client application events. Command can communicate bidirectionally between the server and the client.

In conventional systems, instead of the above-described container stream according to this disclosure, video-data itself or pixel-data of every frame is sent. Herein a container stream refers to a chunk of data transferred between a server and a client, and is also referred to as a data stream. The container stream is transmitted over the network as a packet stream.

The conventional video data itself or pixel data of each frame, even if it is compressed, has a very large capacity to be transferred per second, and if the bandwidth of the network between the server and the client is not large, there are problems like transmission is delayed, a latency occurs, and 3D images on the client side cannot be reproduced smoothly. On the other hand, in the system according to the present disclosure, the data container used for transmission between the server and the client has a much smaller data size than that in the conventional system, so that the number of frames per unit time can be secured at a minimum without worrying about the bandwidth of the network between the server and the client, so that smooth 3D images can be reproduced on the client side.

Figure 5:
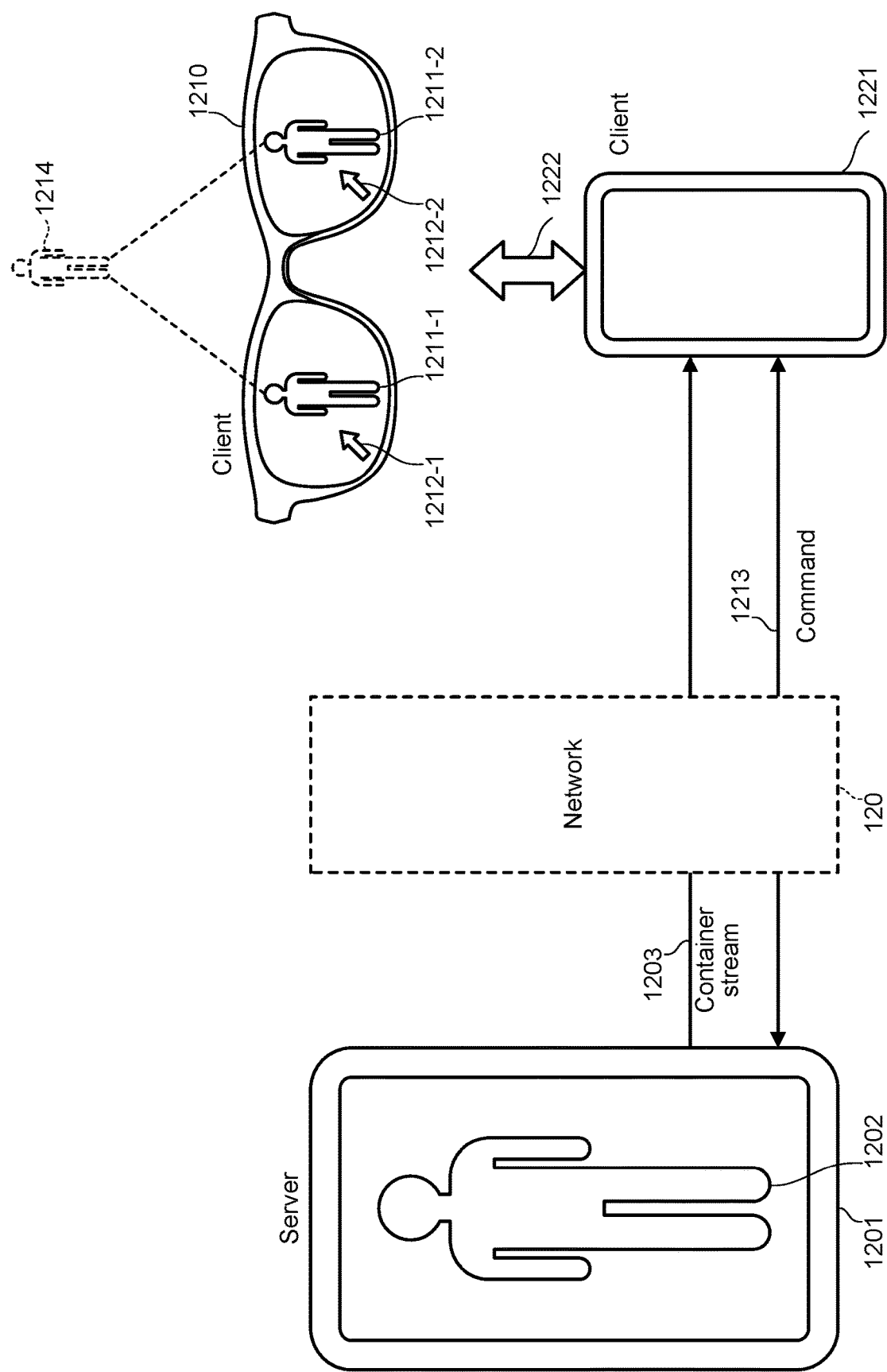
FIG. 5 is a diagram illustrating a data flow for displaying 3D scenes or 3D objects on the client side in a client-server system to which the disclosure is applied.

FIG. 5 is a diagram illustrating a data flow for displaying a 3D scene or a 3D object on the client side in a client-server system to which this disclosure is applied. On the client side, terminal device 1221 such as a smartphone is described, and terminal device 1221 and smart glasses 1210 are connected via wireless communication or wired communication 1222 by a wireless LAN or Bluetooth® or the like. Smart glasses 1210 represents a view seen from the near side by the user. Person 1211-1 and cursor 1212-1 are projected on the left eye of the smart glasses of the client, and person 1211-2 and cursor 1212-2 are projected on the right eye of the smart glasses. To the user of the smart glasses, images of the right eye and the left eye overlap, and stereoscopic person 1214 appears slightly apart from the user. The user of the client-side smart glasses 1210 may use cursor 1212 or other input means to move, rotate, scale, change color/texture, sound, etc. with respect to person 1214 displayed in client-side smart glasses 1210. When the operation is performed on an object (or scene) on such a client, command (or sound) 1213 or the like is transmitted from the client to the server via network 120.

The server that receives a command or the like from the client via network 120 performs an operation according to the received command or the like on the image of the corresponding person 1202 on virtual screen 1201 in the application in the server. Herein the server does not normally need to have a display device, but handles virtual images in a virtual space. Next, the server generates 3D scene data (or 3D object data) after performing an operation such as this command, and transmits the extracted feature amount as container stream 1203 to the client through network 120. The client received container stream 1203 sent from the server rewrites and redisplays the data of the corresponding person 1214 in the client's virtual screen in accordance with the geometry, color/texture, metadata, sound, and commands contained in container stream 1203. In this example, the object is a person, but the object can be anything other than a person, such as a building, a car, an animal, or a still life, and a scene can contain two or more objects.

Figure 6:
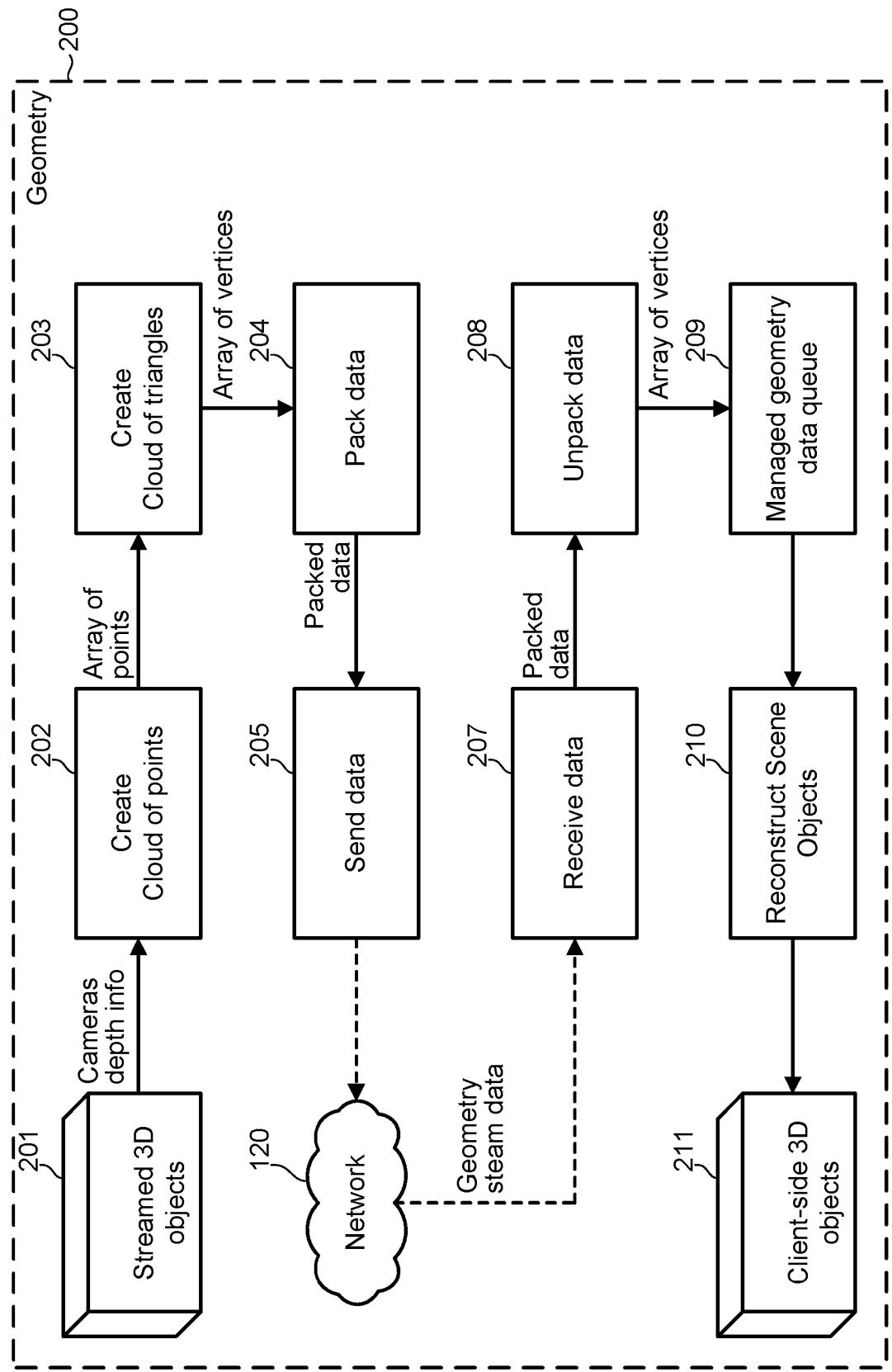
FIG. 6 is a diagram illustrating a process of encoding and decoding geometry information according to the disclosure.
Figure 7:
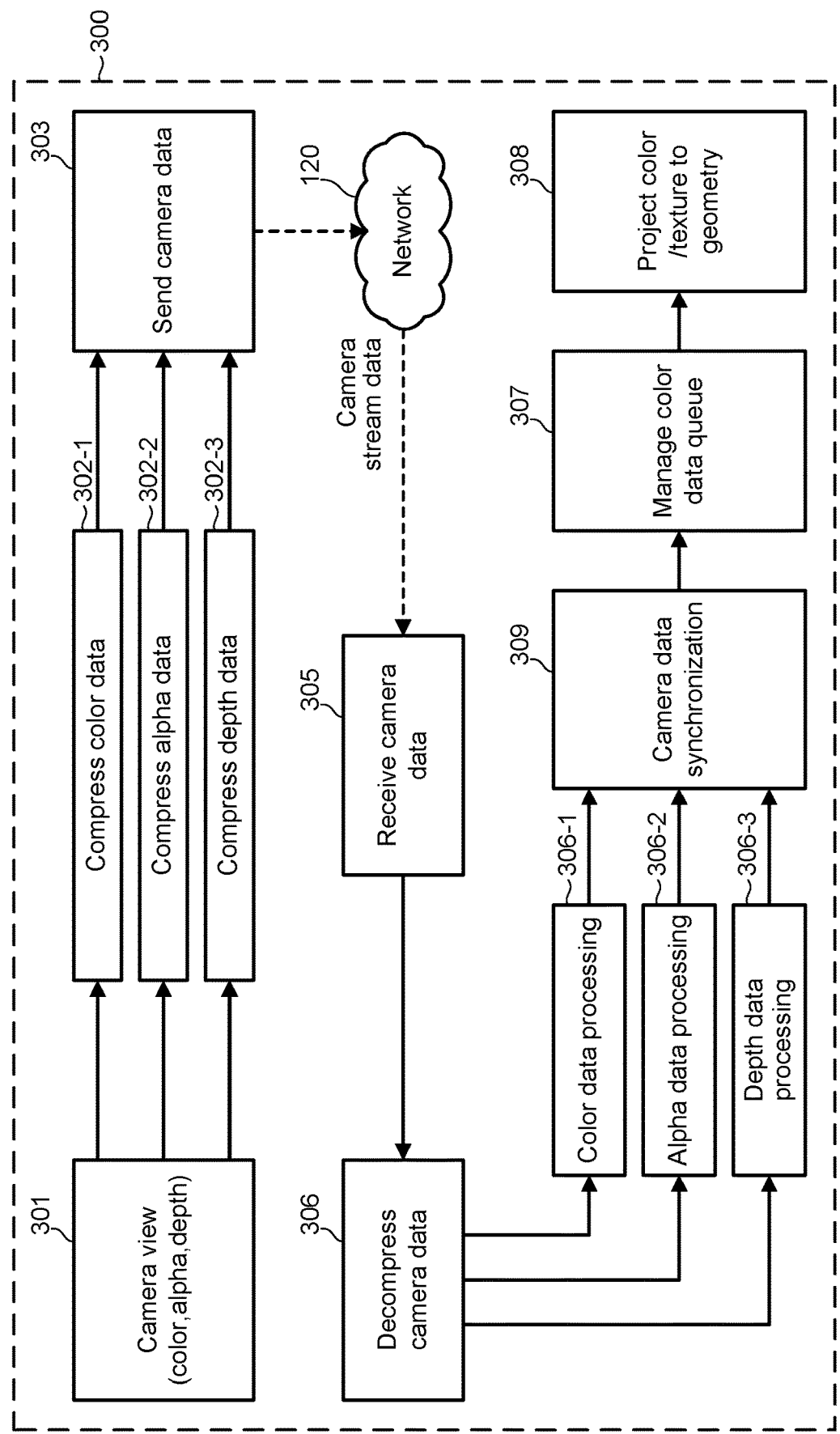
FIG. 7 is a diagram illustrating a process of encoding and decoding color information/texture information according to the disclosure.
Figure 8:
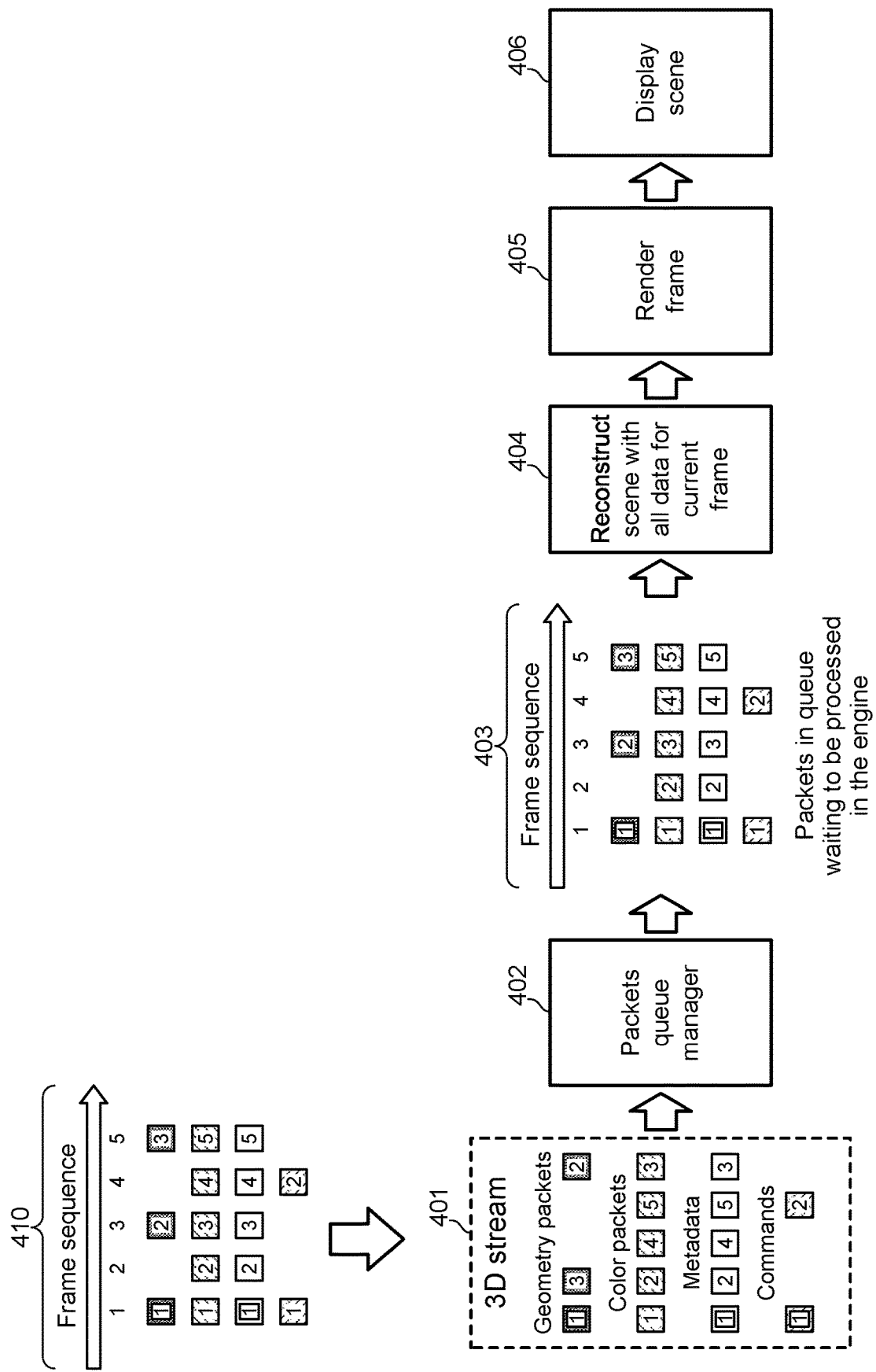
FIG. 8 is a diagram illustrating a data synchronization between geometry, color packets, metadata, and commands according to the disclosure.

Referring now to FIGS. 6-8, it will be described how the "geometry" data and "color" data contained in the container stream described above are processed.

3. Geometry Encoding and Decoding Process

FIG. 6 is a diagram showing processes of encoding and decoding of geometry data according to the disclosure. In FIG. 6, the processing of steps 201 to 205 is performed by the server, and the processing of steps 207 to 211 is performed by the client.

The processes shown in FIGS. 6, and 7 and 8 to be described are executed by a processor such as a CPU and/or a GPU using related programs. The system subject to this disclosure may include only one of the CPU or GPU, but the CPU and GPU are collectively referred to as the CPU in the following sections for simplicity of explanation.

3.1 Server-side Processing

Now assume that there is a scene with an object. Each object has been captured with one or more depth cameras. Herein a depth camera refers to a camera with a built-in depth sensor that acquires depth information. Using the depth camera, depth information can be added to the two-dimensional (2D) images acquired by a normal camera to acquire three-dimensional information of 3D. Herein for example, six depth cameras are used to acquire the complete geometry data of the scene. The configuration of the camera during shooting will be described later.

Streamed 3D objects are generated from images captured at the server, and depth data of the cameras are outputted in step 201. Next, the depth information from the camera is processed to generate a point cloud, and an array of points is outputted in step 202. This point cloud is converted into triangles representing the actual geometry of the object (an array of triangular vertices) and a group of triangles is generated by the server in step 203. Herein as an example, a triangle is used as a figure representing a geometry, but a polygon other than a triangle may be used.

The geometry data is then added to the stream using the data in the array of each vertex of the group of triangles and then the stream is packed in step 204.

The server transmits the container stream containing packed geometry data over network 120 in step 205.

3.2 Processing on the Client Side

The client receives compressed data transmitted from the server, or a container stream containing geometry data, from the server via network 120 in step 207. The client decompresses the received compressed data and extracts an array of vertices in step 208.

The client places the array of vertices of the decompressed data into a managed geometry data queue to correctly align the order of the sequence of frames broken while being transferred over the network in step 209. The client reconstructs the objects in the scene based on the correctly aligned frame sequence in step 210. The client displays the reconstructed client-side 3D on a display in step 211.

Geometry data is stored in a managed geometry data queue and synchronization with other data received in the stream in step 209. This synchronization will be described later with reference to FIG. 8.

The clients to which this disclosure is applied generate meshes based on the received arrays of vertices. In other words, since only arrays of vertices are transmitted as geometry data from the server to the client, the amount of data per second in the array of vertices is typically much less than that of video and frame data. On the other hand, another conventional option is to apply a large amount of triangles to a given mesh of data, and this method requires a large amount of processing on the client side, which has been problematic.

Since the server to which this disclosure is applied sends only the data of the part of the scene (usually containing one or more objects) that needs to be changed (for example, a particular object) to the client, and does not send the data of the part of the scene that has not being changed to the client, this point can also reduce the amount of data transmitted from the server to the client due to the scene change.

Systems and methods employing this disclosure assume that arrays of vertices of polygon meshes are transmitted from servers to clients. Although a triangular polygon is assumed as the polygon, the shape of the polygon is not limited to a triangle and may be a square or another shape.

4. Color/Texture Encoding and Decoding Processing

FIG. 7 is a diagram showing processes of encoding and decoding of color information/texture information according to the disclosure. In FIG. 7, the processing of steps 301 to 303 is performed by the server, and the processing of steps 305 to 308 is performed by the client.

4.1 Color Server-side Processing

Suppose there is a scene with an object. Using the view from the camera, the server extracts the color data, alpha data, and depth data of the scene in step 301. Herein the alpha data (or alpha value) is a numerical value indicating additional information provided for each pixel separately from the color information. Alpha data is often used particularly as transparency. The set of alpha data is also called an alpha channel.

The server then adds each of the color data, alpha data, and depth data to the stream and compresses them in steps 302-1, 302-2, and 302-3. The server sends the compressed camera data as part of the container stream to the client via network 120 in step 303.

4.2 Client-side Processing of Colors

The client receives a container stream containing the compressed camera data stream via network 120 in step 305. The client decompresses the received camera data, as well as preparing a set of frames in step 306. Next, the client processes color data, alpha data, and depth data of the video stream from the decompressed camera data respectively in steps 306-1, 306-2, and 306-3. Herein these raw feature amount data are prepared and queued for application to the reconstructed 3D scenes. The color data is used to wrap meshes of the reconstructed 3D scenes with the texture.

Additional detail information with the depth and alpha data are also used. The client then synchronizes the color data, alpha data, and depth data of the video stream in step 309. The client stores the synchronized color data, alpha data, and depth data in a queue and manages the color data queue in step 307. The client then projects the color/texture information to the geometry in step 308.

FIG. 8 is a diagram illustrating a data synchronization between geometry packets, color packets, metadata, and commands according to the disclosure.

To make the data available on the client side, the data must be managed in a way that provides the correct content of the data in the stream while playing back 3D images received on the client side. Since data packets going through the network are not necessarily transmitted in a reliable method, and packet delays and/or packet order changes may occur. Thus, while the client receives the container stream of data, the client's system must consider how to manage synchronization of the data. The basic scheme for synchronizing the geometry, color, meta-data, and commands according to the disclosure are as follows. This scheme may be standard for data formats created for network applications and streams.

Referring to FIG. 8, 3D stream 410 transmitted from the server includes geometry packets, color packets, metadata, and commands. The geometry packets, color packets, metadata, and commands contained in 3D stream are synchronized to each other as shown in frame sequence 410 at the time 3D stream is created on the server.

In this frame sequence 410, time flows from left to right. However, when the frame sequence 410 transmitted from the server is received by the client, there may be cases where mutual synchronization cannot be obtained while passing through the network or random delays may occur, as indicated in 3D stream 401 received on the client side. That is, within 3D stream 401 received by the client, it can be seen that the geometry packets, color packets, metadata, and commands may be different in order or location in the sequence from 3D stream 410 when created by the client.

3D stream 401 received at the client is processed by packet queue manager 402 back to its original synchronization to generate frame sequence 403. In frame sequence 403 in which synchronization is restored by packet queue manager 402 and the different delays are eliminated from each other, the geometry packets 1, 2, and 3 are in the correct order and arrangement, the color packets 1, 2, 3, 4, and 5 are in the correct order and arrangement, the metadata 1, 2, 3, 4, and 5 are in the correct order and arrangement, and the commands 1 and 2 are in the correct order and arrangement. That is, frame sequence 403 after alignment in the client is the same order as frame sequence 410 created in the server.

The scene is then reconstructed using the data for the synchronized present frame in step 404. The reconstructed frames are then rendered in step 405 and the client displays the scene on the display in step 406.

Figure 9:
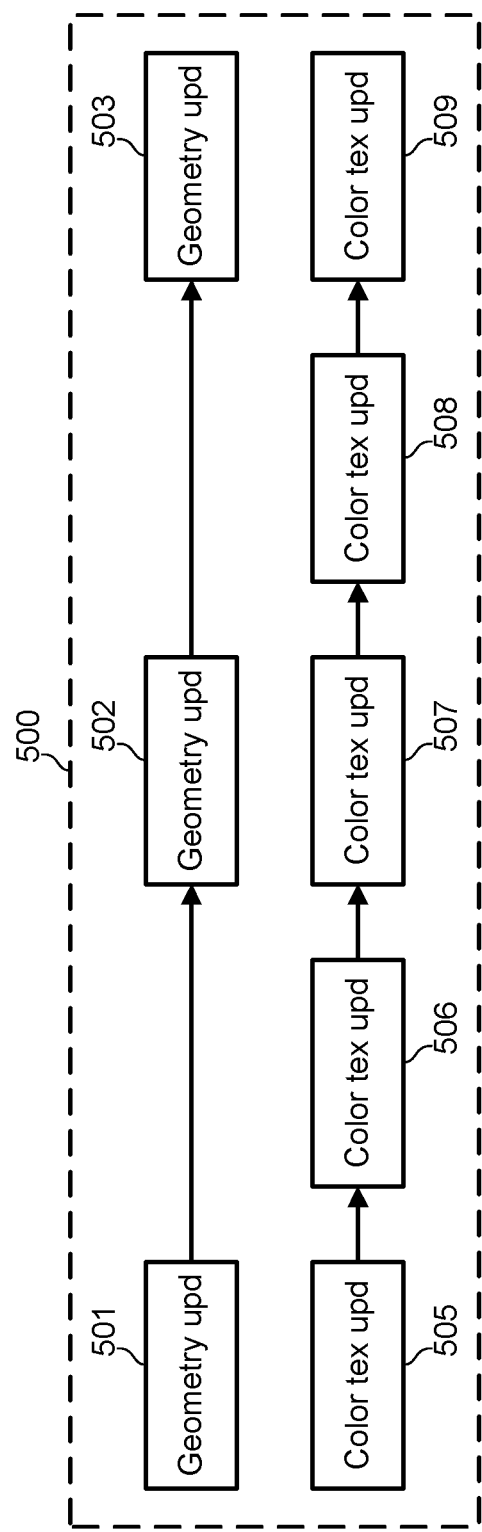
FIG. 9 is a diagram showing a decal process according to this disclosure.

FIG. 9 shows an example of a sequence update flow 500. In FIG. 9, the time flows from left to right. Referring to FIG. 9, first, the geometry is updated in step 501. Herein the color/texture is updated in synchronization with it (i.e. with the lateral position coinciding) in step 505. Next, the color/texture is updated in step 506, but the geometry is not updated (e.g., if the color has changed but there is no motion). Next, the geometry is updated in step 502 and the color/texture is updated in synchronization thereto in step 507. Next, the color/texture is updated in step 508, but the geometry is not updated. The geometry is then updated 503 and the color/texture is updated in synchronization thereto in step 509.

As can be seen from FIG. 9, the geometry need not be updated each time the color/texture is updated, and conversely, the color/texture need not be updated each time the geometry is updated. Geometry updates and color/texture updates may be synchronized. Also, the color/texture update needs not necessarily to be a color and texture update, but may be either a color or texture update. In this figure, color/texture updates are described twice, while geometry updates are described once, but this is an example and may be other frequencies.

Figure 10:
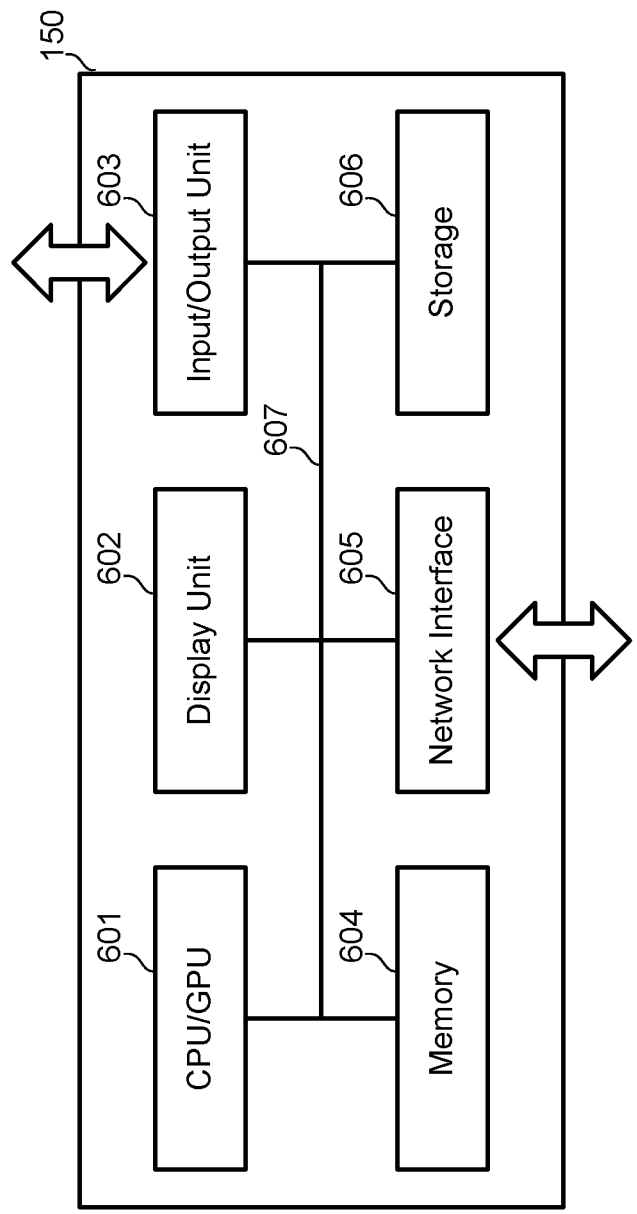
FIG. 10 is a schematic diagram showing an exemplary hardware configuration of a client according to the disclosure.

FIG. 10 is a schematic diagram showing an exemplary hardware configuration of the client according to this disclosure. Client 1-150 may be a terminal such as a smartphone or a mobile phone. Client 1-150 typically comprises CPU/GPU601, display unit 602, input/output unit 603, memory 604, network interface 605, and storage unit 606, which are communicatively coupled to each other by bus 607.

CPU/GPU601 may be a single CPU or a single GPU, or may consist of one or more components that are adapted to operate in conjunction with the CPU and the GPU. Display unit 602 is generally a device for displaying an image in color, and displays a 3D image according to the disclosure and presents it to the user. Referring to FIG. 5, as described above, the client may be a combination of a client terminal and a smart glasses, in which case the smart glasses has the function of display unit 602.

Input/output unit 603 is a device for interacting with the outside, such as a user, and may be connected to a keyboard, a speaker, buttons, or a touch panel inside or outside client 1-150. Memory 604 is a volatile memory for storing software and data required for operation of CPU/GPU601. Network interface 605 has a function for client 1-150 to connect to and communicate with an external network. Storage unit 606 is a non-volatile memory for storing software, firmware, data, and the like required by client 1-150.

Figure 11:
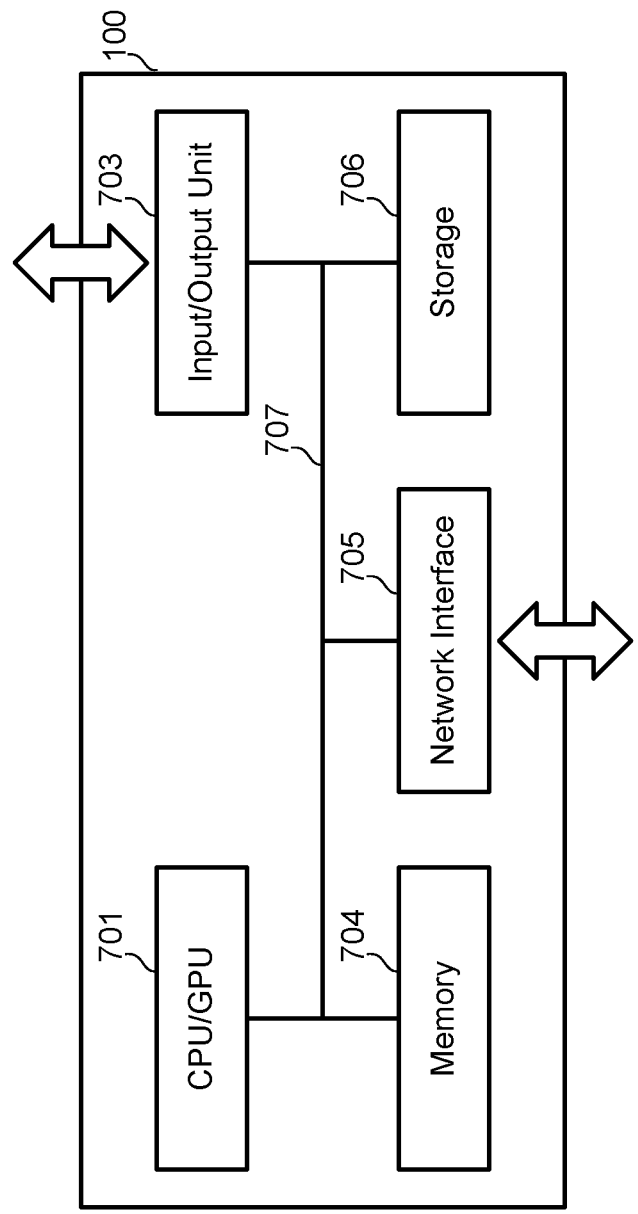
FIG. 11 is a schematic diagram showing an exemplary hardware configuration of a server according to the disclosure.

FIG. 11 is a schematic diagram illustrating an example of a hardware configuration of a server according to the disclosure. Server 100 typically has a higher performance CPU than the client, a higher communication speed, and a higher capacity storage device. Server 100 typically comprises CPU/GPU701, input/output unit 703, memory 704, network interface 705, and storage unit 706, which are communicatively coupled to each other by bus 707.

CPU/GPU701 may be a single CPU or a single GPU, or may consist of one or more components that are adapted to operate in conjunction with the CPU and the GPU. The client device described in FIG. 10 includes display unit 602, but in the case of a server, the display unit is not required. Input/output unit 703 is a device for interacting with a user or the like, and may be connected to a keyboard, a speaker, buttons, or a touch panel. Memory 704 is a volatile memory for storing software and data required for operation of CPU/GPU 701. Network interface 705 provides the capability for server 100 to connect and communicate with an external network. Storage device 706 is a non-volatile storage device for storing software, firmware, data, and the like required by server 100.

Figure 12:
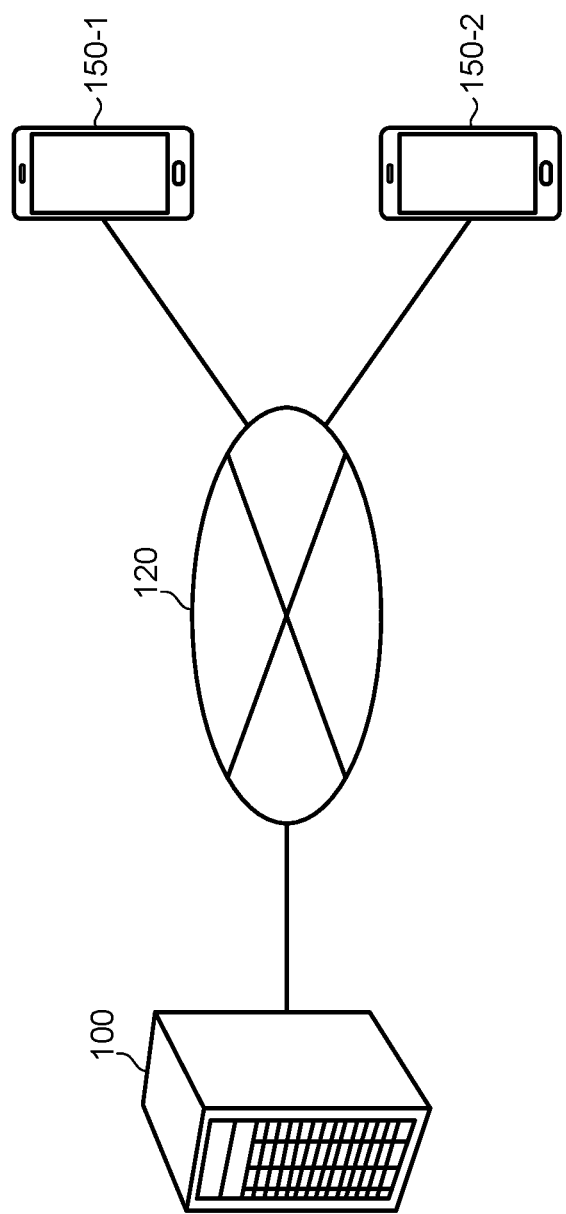
FIG. 12 is a schematic diagram illustrating an exemplary configuration of an information processing system according to the disclosure.

FIG. 12 is a schematic diagram showing an exemplary configuration of an information processing system according to this disclosure. Server 100, client 1-150-1, and client 1-150-2 are communicatively coupled to each other by network 120.

Server 100 is, for example, a computer device such as a server that operates in response to an image display request from client 1-150-1 and client 1-150-2 to generate and transmit information related to the image for display on client 1-150-1 and client 1-150-2. In this example, two clients are described, but at least one client can be used.

Networks 120 may be a wired or wireless LAN (Local Area Network), and clients 1-150-1 and 1-150-2 may be smartphones, mobile phones, slate PCs, gaming terminals, or the like.

Figure 13:
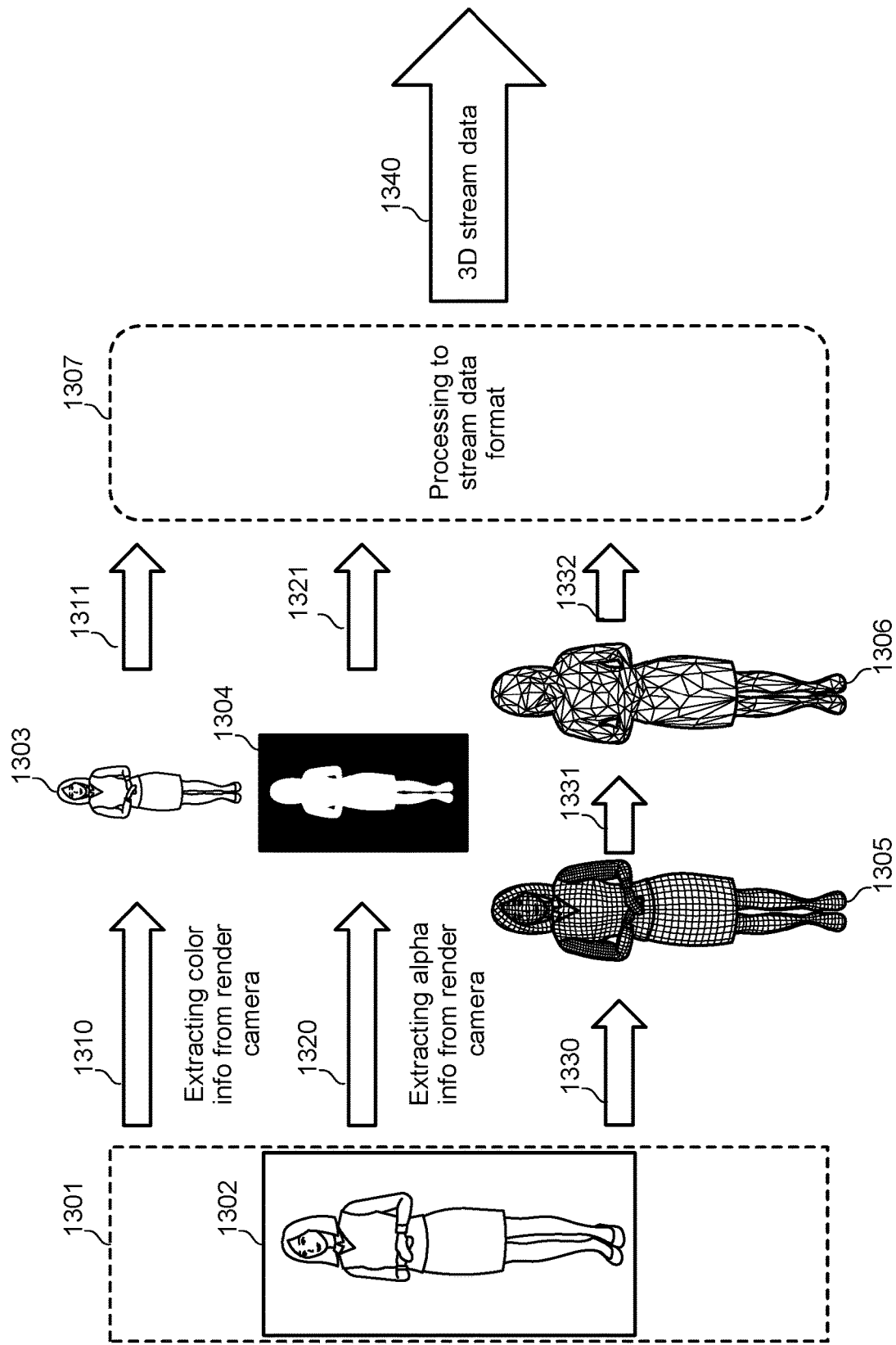
FIG. 13 is a schematic diagram showing the process flow of the server-side according to the disclosure.

FIG. 13 is a schematic diagram showing the flow of the server-side process according to the disclosure. An RGB camera is used to extract color information 1303 from object 1302 in scene 1301 on the server side in step 1310. Alpha information 1304 is extracted from object 1302 in server-side scene 1301 using RGB camera 1320. From object 1320 in scene 1301 of the server side, the information of point group 1305 is extracted using depth camera 1330. Next, the information of point cloud 1305 is simplified to obtain geometry information 1306 in step 1331.

Next, resulting color information 1303, alpha information 1304, and geometry information 1306 are processed into stream data format 1307 and transmitted to the client over the network as a container stream of 3D stream in step 1340.

Figure 14:
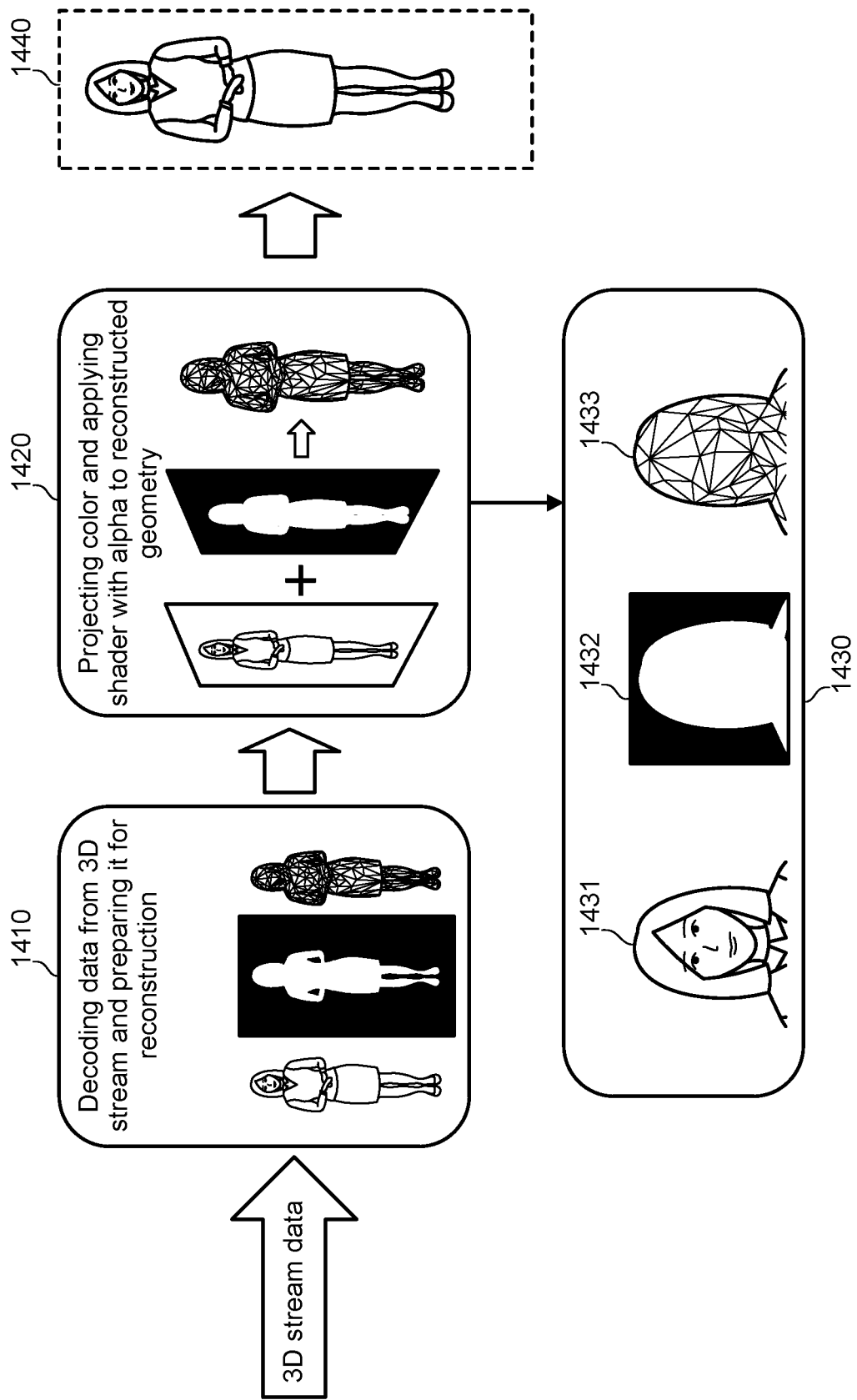
FIG. 14 is a schematic diagram showing a flow of processing of the client-side according to the disclosure.

FIG. 14 is a schematic diagram showing the flow of a client-side process according to the disclosure. FIG. 14 relates to a decal process according to this disclosure. Herein decal is the process of pasting a texture or a material on an object. Herein texture refers to data used to express texture, patterns, irregularities (asperities), etc. of 3D (three-dimensional) CG model. The material refers to the material of the object, and in 3DCG refers to, for example, the optical characteristics and the material feeling of the object.

The reason why this disclosure's decal methodology is lighter for processor than traditional UV-mapping is described below. Currently, there are several ways to set the color for the mesh. Herein the UV is a coordinate system used to specify the position, orientation, size, and the like to be pasted when the textures are mapped to 3DCG models. In a two-dimensional orthogonal coordinate system, the horizontal axis is U and the vertical axis is V. Texture mapping using a UV coordinate system is called UV mapping.

5.1 How to set Color for Each Vertex (Conventional Method 1)

Store color values at the vertices for all triangles in the target cloud.

However, lower vertex density results in lower resolution texturing, which degrades the user experience. Conversely, a high vertex density is the same as sending colors to all the pixels on the screen, increasing the amount of data transferred from the server to the client. On the other hand, this can be used as an additional/basic coloring step.

5.2 How to set the Correct Texture for the UV of the Mesh (Conventional Method 2)

In order to set the correct texture by UV mapping, it is necessary to generate textures of a group of triangles. It then needs to create a UV map for the current mesh and add it to the stream. The original texture of the model is substantially unusable because it does not contain information such as lightning of scenes, and a large amount of texture is required for a high-quality and detailed 3D model. Another reason why this method is not employed is that the original texture operates on UVs created with 3D modeling rendered on the servers. Generally, a group of triangles is used to project a coloring texture from different views and to store and transmit the received UV texture. In addition, the amount of data transmitted and received between the server and the client increases because the geometry and topology of the mesh must be updated at the same frequency as the UV texture.

5.3 Projecting a Texture on a Mesh (Decal) Method (This disclosure Method)

Color/texture from a specific location in the stream is sent from the server to the client along with meta information about that location. The client projects this texture from the specified position onto the mesh. In this case, no UV map is required. In this method, the streamed side, i.e., the client side, is not loaded with UV generation. This decal approach can provide room for optimization of the data flow (e.g., updating geometry and color can be done continuously at different frequencies).

The processing on the client side shown in FIG. 14 basically performs processing opposite to the processing on the server side shown in FIG. 13. First, the client receives a container stream, which is a 3D stream sent by the server over the network. Then, the data is decoded from the received 3D stream and the color information, alpha information, and geometry information are restored to reconstruct the object in step 1410.

Next, first, color information 1431 and alpha information 1432 are combined to generate texture data as a result. The texture data is then applied to geometry data 1433 in step 1420. This allows the objects on the server to be reconfigured on the client in step 1440. If there are multiple objects in the scene on the server side, such processing is applied for each object.

Figure 15:
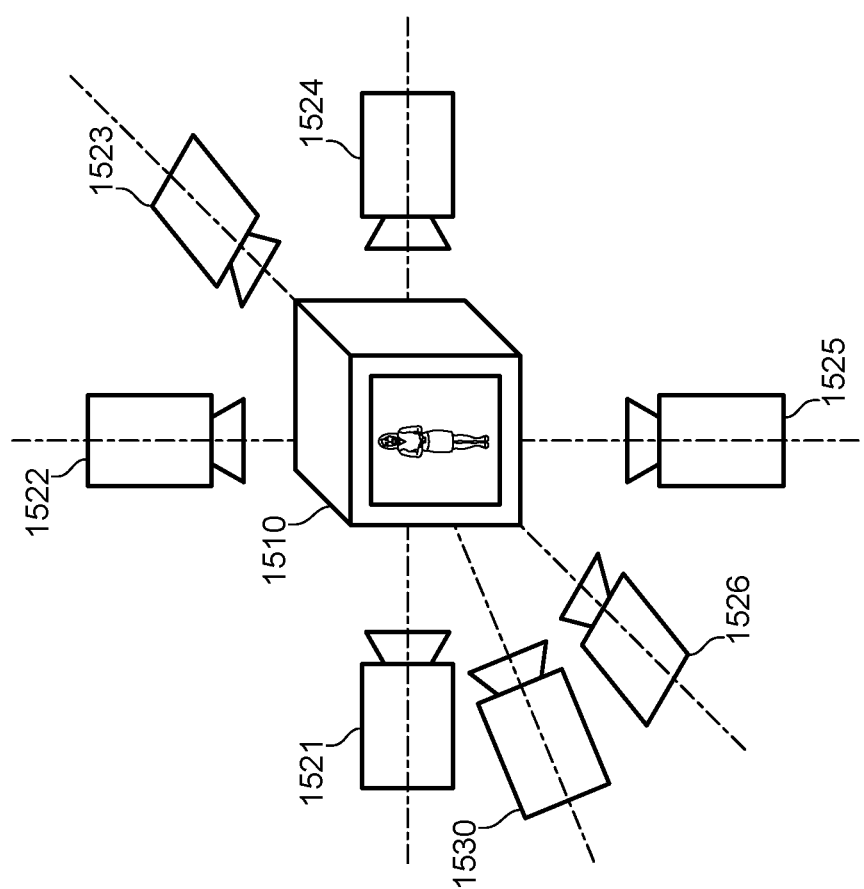
FIG. 15 is a diagram showing the arrangement of the cameras used in the disclosure.

FIG. 15 shows the arrangement of the cameras used in this disclosure. One or more depth cameras can be used to obtain geometry information for objects in scene of interest 1510. The depth camera captures depth maps every frame, and these depth maps are then processed into point clouds. The point cloud is then divided into predetermined triangular meshes for simplicity. By changing the resolution of the depth camera, it is possible to control the degree of detail (level of fineness, or granularity) of the mesh divided into triangles. For example, the standard setting envisioned uses six depth cameras 1521-1526 with 256×256 resolution. However, the required number of depth cameras and the required resolution of each camera can be further optimized to reduce, and the performance, i.e., image quality and amount of transmission data, will vary depending on the number of depth cameras and their resolution.

As an example, FIG. 15 shows a configuration in which six depth cameras 1521 to 1526 and one normal camera 1530 are arranged. Conventional camera (i.e., an RGB camera) 1530 is used to capture color and alpha information of objects in scene of interest 1510.

Alternative method may be to use only a regular RGB camera without using a depth camera. In this case, the position of the object is estimated from the image acquired by the RGB camera, and the geometry information is created. Note that there is an alternative approach bypassing the concept of the virtual cameras to process the mesh directly. That is bypassing the data capture step, point cloud processing, and tessellation using the tessellated data directly, making use of the graphics engine intrinsic shader to manage the geometry information.

Figure 16:
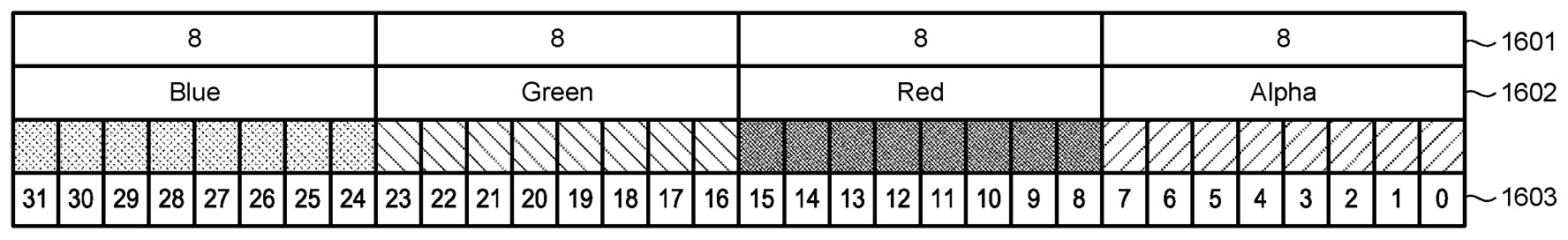

FIG. 16 is a diagram showing a configuration of pixels in an ARGB system used in this disclosure. The ARGB system adds alpha information (A) which represents transparency to the color information of conventional RGB (red, green, blue). In the illustrative example shown in FIG. 16, each of alpha, blue, green, and red is represented by 8 bits (i.e., 256 gray levels), i.e., a 32-bit configuration throughout ARGB. In FIG. 16, reference numeral 1601 denotes the number of bits of each color or alpha, 1602 denotes each color or alpha, and 1603 denotes a configuration of 32 bits as a whole. In this embodiment, a 32-bit ARGB system having 8-bit configurations of colors and alpha as a whole is described, but the number of these bits can be changed in accordance with a desired image quality and a transmission data amount.

Alpha information can be used as a mask/secondary layer for color images. Due to the current hardware encoder restrictions, it is time consuming to encode the video stream for color information with alpha information. Also, software encoders for colors and alpha for video streams cannot be an alternative to this disclosure at present because they cannot be encoded in real time, are delayed, and cannot achieve the objectives of the present disclosure.

6.1 Advantages of Reconstruction of the Geometry of a 3D Stream Scene According to this Disclosure The advantages of geometric reconstruction of 3D streaming scenes using this disclosure methods are as follows. This disclosure approach reconstructs every scene on the client-side by reconstructing the scene using a "cloud of triangles". An important aspect of this innovative idea is that it is ready to use a large number of triangles on the client side. The number of triangles included in the group of triangles may be hundreds of thousands.

The clients are ready to place their triangles at the appropriate locations to create the shapes of 3D scenes as soon as they obtain information from the streams. Since this disclosure method transfers less data from the server to the clients than before, the advantages of this method are that the power and time required to process the data can be reduced. Rather than the conventional method of generating a mesh per frame, the position of the existing geometry is changed. However, by changing the position of the existing geometry, it is possible to change the position of the group of triangles once generated in the scene. Thus, the geometry data provides the coordinates of each triangle, and this change in position of the object is dynamic.

6.2 Advantages of 3D Streaming According to this Disclosure

The advantages of the 3D streaming according to this disclosure are that even six Degree of Freedom are less delayed. One of the advantages of the 3D streaming formats is that there are 3D scenes on the client-side as well. When navigating in mixed reality (MR) or looking around in images, the key part is how 3D contents are connected to the real world, and how "the real position is felt to it". In other words, if the user is not aware of the delay of the location update by the device as he or she is walking around some displayed objects, the human brain will be illusioned that this object is indeed at that location. Currently, client-side devices target 70 to 90 FPS (frames per second) and update 3D contents on the display to make the user think this is "real". Today, it is not possible to provide a full cycle of frame updates on a remote server with a latency of 12 ms or less. In fact, the sensor of the AR-device provides information more than 1,000 FPS. This disclosure approach can then synchronize the 3D content on the client side, as it is already possible with modern devices to synchronize the 3D content on the client side. Therefore, after reconfiguring 3D scene, it is the client's job to process the location of the extended content on the client side, and it is possible to solve any reasonable networking issues (e.g., transmission delays) that do not affect reality.

Example 2

Embodiments (Configuration of Information Processing System)

Figure 17:
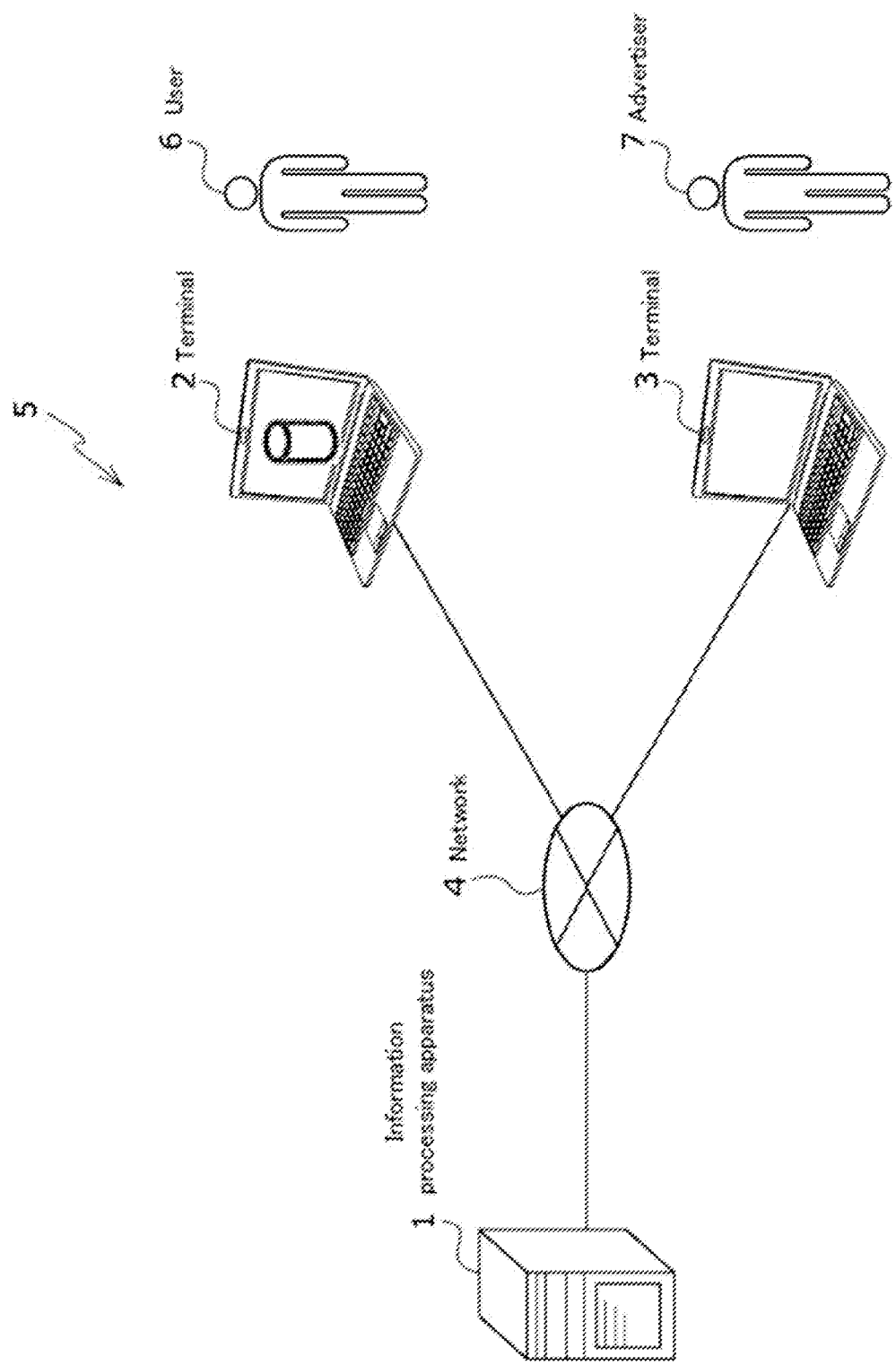
FIG. 17 schematically illustrates an example of a configuration of an information processing system according to an embodiment.

FIG. 17 schematically illustrates an example of a configuration of an information processing system according to an embodiment.

This information processing system 5 is composed of information processing apparatus 1, terminal 2, and terminal 3 connected with one another through network 4 such that information processing apparatus 1, terminal 2, and terminal 3 are capable of communicating with one another. Terminal 2 and terminal 3 are operated by user 6 and advertiser 7, respectively.

Information processing apparatus 1 is a server-type information processing apparatus that operates in response to a request of terminal 2 and terminal 3 and includes electronic components such as a Central Processing Unit (CPU) having a function for processing information, a flash memory, and the like in a main body. Note that information processing apparatus 1 does not necessarily have to be a single server, but may be a plurality of servers having executable functions distributed to the servers and operating collaboratively with one another, or may be a system that operates in the cloud.

Terminal 2 and terminal 3 are information processing apparatuses such as Personal Computers (PCs), smartphones, tablet terminals, and the like, and include electronic components such as a CPU having functions for processing information, flash memory, camera for image capturing, and the like in the main body.

Network 4 is a communication network capable of high-speed communication, and is, for example, a wired or wireless communication network such as the Internet, an intranet, or a Local Area Network (LAN).

Cloud rendering server/streamer 8 is an information processing device such as a server that creates 2D and/or 3D or other images in response to requests received from terminal 2 or terminal 3 via network 4 and streams the created 2D and/or 3D images. Cloud rendering server/streamer 8 may be connected to information processing apparatus 1 via network 4, or cloud rendering server/streamer 8 may be directly connected to information processing device 1. In FIG. 17, cloud rendering server/streamer 8 is described as a device separate from information processing apparatus 1, but cloud rendering server/streamer 8 may be realized by a program or other means as one function of information processing apparatus 1.

By way of example, information processing apparatus 1 creates content (e.g., a three-dimensionally (3D) displayed banner advertisement) in response to a request of terminal 3 operated by advertiser 7, and the created content is delivered together with information on any home page in response to a request of terminal 2 operated by user 6 who browses the home page. The content delivered to terminal 2 is executed at terminal 2 and, as a result of the execution, the content is displayed on a display section of terminal 2 as a 3D object in a banner advertisement contained in the home page. Presentations such as the position, the image-capturing direction, and the like of an object are changed based on an operation of user 6. An event occurring in the content by the operation performed on the object at terminal 2 is transmitted to information processing apparatus 1 and stored as an event history (here, the "event" is a user's reaction to the banner advertisement, and is an extended operation ("interaction") by the user, such as browsing the banner advertisement or clicking on the banner advertisement, as referred to in web analytics, which will be described in detail later). Information processing apparatus 1 analyzes the event history in response to a request of terminal 3, and outputs, as an analysis result, contents such as the interest of user 6 in the content, the action taken on the content, and the like to terminal 3. Terminal 3 receives the analysis result from information processing apparatus 1, and displays the analysis result on the display section. Advertiser 7 confirms the analysis result displayed on the display section of terminal 3 to confirm the effect of the advertising activity. Further, information processing apparatus 1 changes the contents of the content (initial setting (model, color, arrangement, angle, etc.) of the content, operating condition, and/or the like) according to the analysis result in accordance with preset contents.

Note that the configuration illustrated in FIG. 17 is an example for explaining the embodiment, and each element included in the configuration can be changed appropriately as described below. For example, advertiser 7 is an example of a person who creates and delivers content, and is not limited to an advertiser who provides an advertisement, but may be a person who analyzes an advertisement, an advertising industry, a person who creates a web page or an application, a person who manages an electronic commerce brand, a person who manages an electronic commerce site, a person who is in the distribution industry, or the like. Correspondingly, the content is not limited to a banner advertisement, and may be content of a product page, content operating on an application, or the like. Further, the content is not limited to 3D, but may also be in 2D, 4D, or higher dimensions as long as an object in the content, the viewpoint thereto, and the like are deformable or changeable. Terminal 2 does not always have to be connected to network 4, but may transmit the event history to information processing apparatus 1 at any timing when connected to the network. Further, terminal 2 may transmit the event history to information processing apparatus 1 at any timing even while being always connected to the network.

Configuration of Information Processing Apparatus

Figure 18:
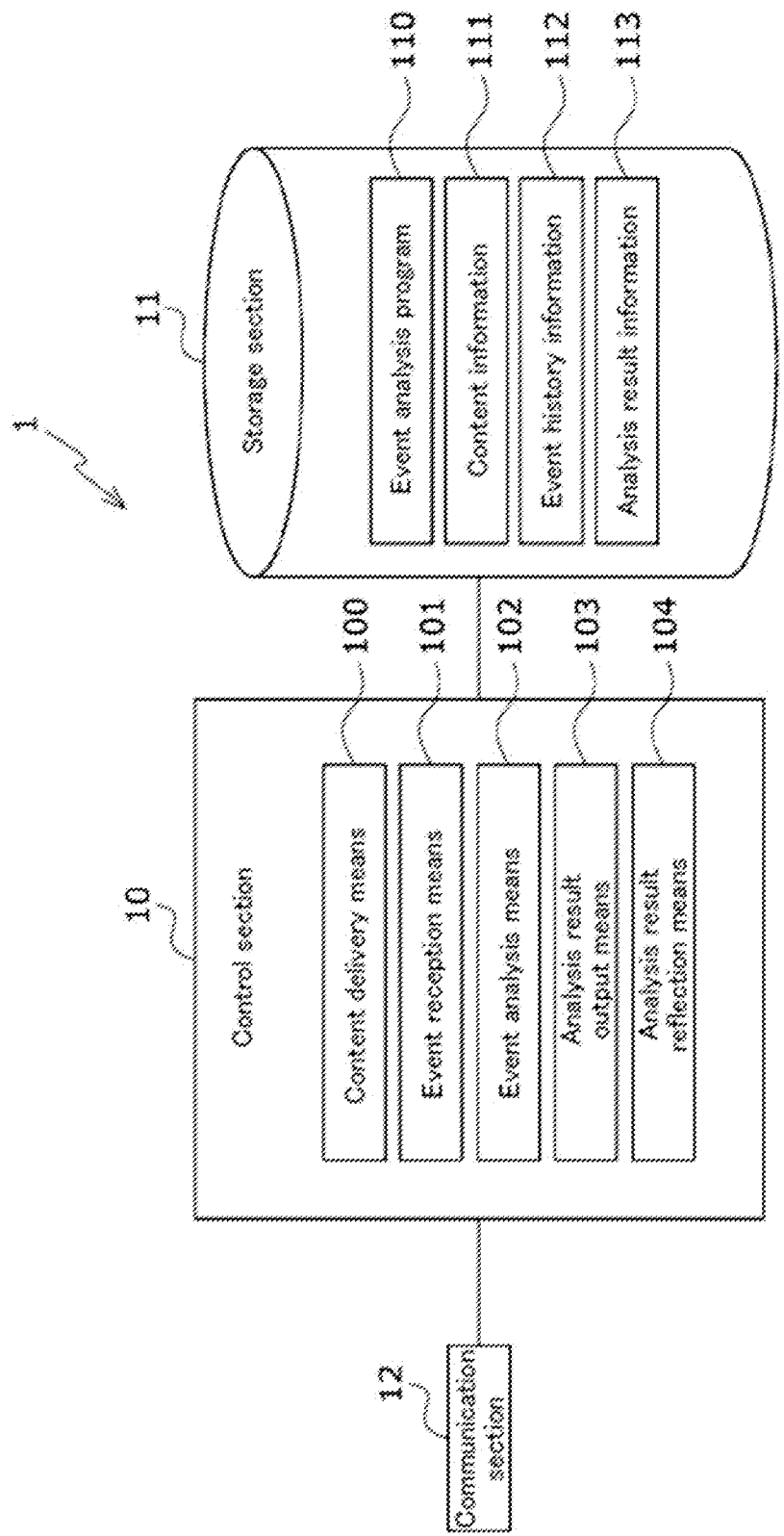
FIG. 18 is a block diagram illustrating a configuration example of an information processing apparatus according to the embodiment.

FIG. 18 is a block diagram illustrating a configuration example of information processing apparatus 1 according to the embodiment.

Information processing apparatus 1 includes: control section 10 that is composed of a CPU and the like, controls each section, and executes various programs; storage section 11 that is composed of a storage medium such as a flash memory and stores information; and communication section 12 that communicates with the outside via a network.

Control section 10 functions as content delivery means 100, event reception means 101, event analysis means 102, analysis result output means 103, analysis result reflection means 104, and the like by executing event analysis program 110, which will be described later.

Content delivery means 100 delivers, to terminal 2 through communication section 12 and network 4, content information 111 for displaying a banner advertisement in response to a delivery request of terminal 2. Note that, content information 111 may be content displayed in 3D, and may also be content displayed in Augmented Reality (AR), Virtual Reality (VR), Mixed Reality (MR), Substitutional Reality (SR), or Extended Reality (XR). Content information 111 may also be in 2D, 4D, or higher dimensions as long as an object displayed in the content is deformed or changed.

Event reception means 101 receives, at any timing, an event occurring as a result of execution of content information 111 at terminal 2 and an operation on content information 111 at terminal 2, and stores the received event in storage section 11 as event history information 112.

Event analysis means 102 analyzes event history information 112 and generates analysis result information 113. Note that an analysis method will be described later.

In response to a request of terminal 3, analysis result output means 103 outputs analysis result information 113 to terminal 3 operated by advertiser 7.

In accordance with the preset contents, analysis result reflection means 104 changes initial setting values of the color, model, image-capturing angle, arrangement angle, option, and the like of content information 111 in storage section 11 or the content information delivered to terminal 2.

Storage section 11 stores event analysis program 110 that causes control section 10 to operate as each of above-described means 100 to 104, content information 111, event history information 112, analysis result information 113, and the like.

Configuration of Terminal

Figure 19:
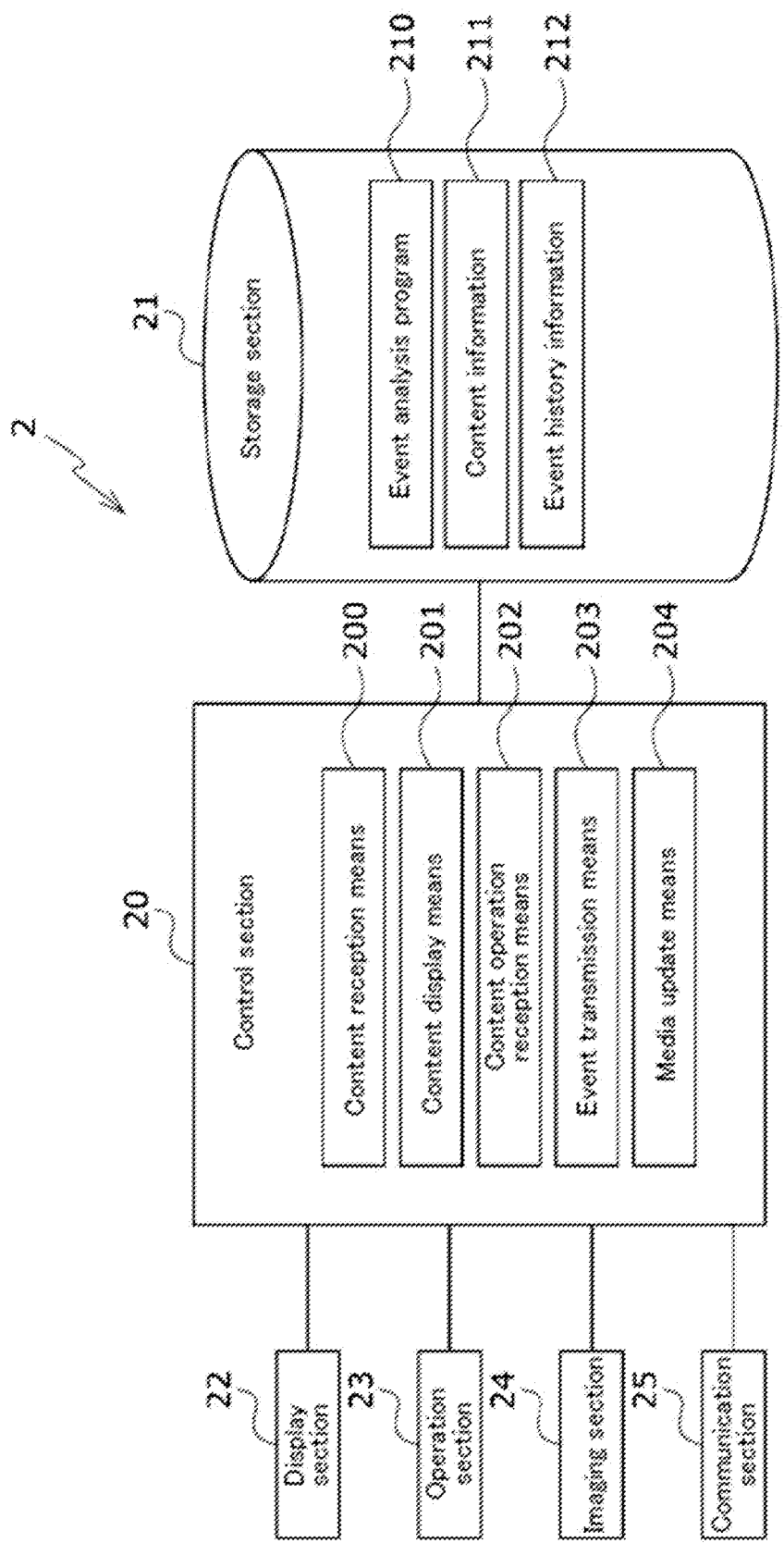
FIG. 19 is a block diagram illustrating a configuration example of a terminal according to the embodiment.

FIG. 19 is a block diagram illustrating a configuration example of terminal 2 according to the embodiment.

Terminal 2 includes: control section 20 that is composed of a CPU and the like, controls each section, and executes various programs: storage section 21 that is composed of a storage medium such as a flash memory and stores information: display section 22 such as a Liquid Crystal Display (LCD) that displays characters and images: operation section 23 such as a keyboard, a mouse, or a touch panel for generating an operation signal in response to an operation: imaging section 24 including a lens and an imaging element for capturing a photograph or a video; and communication section 25 for communicating with the outside via a network. In addition, although not illustrated, a microphone for collecting a sound and a speaker for outputting the sound are provided to play multimedia content.

Control section 20 functions as content reception means 200, content display means 201, content operation reception means 202, event transmission means 203, media update means 204, and the like by executing event analysis program 210, which will be described later.

Content reception means 200 receives, through communication section 25 and network 4, content information 111 delivered from information processing apparatus 1 and stores the content information in storage section 21 as content information 211.

Content display means 201 executes content information 211 to display a 3D banner advertisement on display section 22, and changes the displayed contents of the banner advertisement in accordance with an operational content of an operation received by content operation reception means 202.

Content operation reception means 202 receives the operation performed on operation section 23, converts the operation into the operational content corresponding to the execution state of content information 211, generates an event corresponding to the execution state, and stores the generated event in storage section 21 as event history information 212. The contents of the event will be described later.

Event transmission means 203 transmits the generated event to information processing apparatus 1 as event history information 212. The transmission timing may be a timing of occurrence of each event, or may be timings at predetermined intervals. In the case of the timings at predetermined intervals, events having occurred are collectively transmitted. Note that, for example, when event analysis program 210 is configured via an external Application Programing Interface (API), event transmission means 203 may first transmit event history information 212 to an external server and event history information 212 may then be transmitted from the external server to information processing apparatus 1, instead of directly transmitting event history information 212 to information processing apparatus 1. Event history information 212 may be transmitted from the external server to information processing apparatus 1 at a timing of once per certain amount of data, at a timing of once per certain period of time, or one by one. The timing may be in real time or may be delayed.

Media update means 204 changes the initial setting values of the color, model, image-capturing angle, arrangement angle, and option of content information 211 in accordance with the contents requested by analysis result reflection means 104 of information processing apparatus 1.

Storage section 21 stores event analysis program 210 that causes control section 20 to operate as each of above-described means 200 to 204, content information 211, event history information 212, and the like.

FIGS. 20A to 20I illustrate examples of a screen displayed on display section 22 of terminal 2.

Figure 20A:
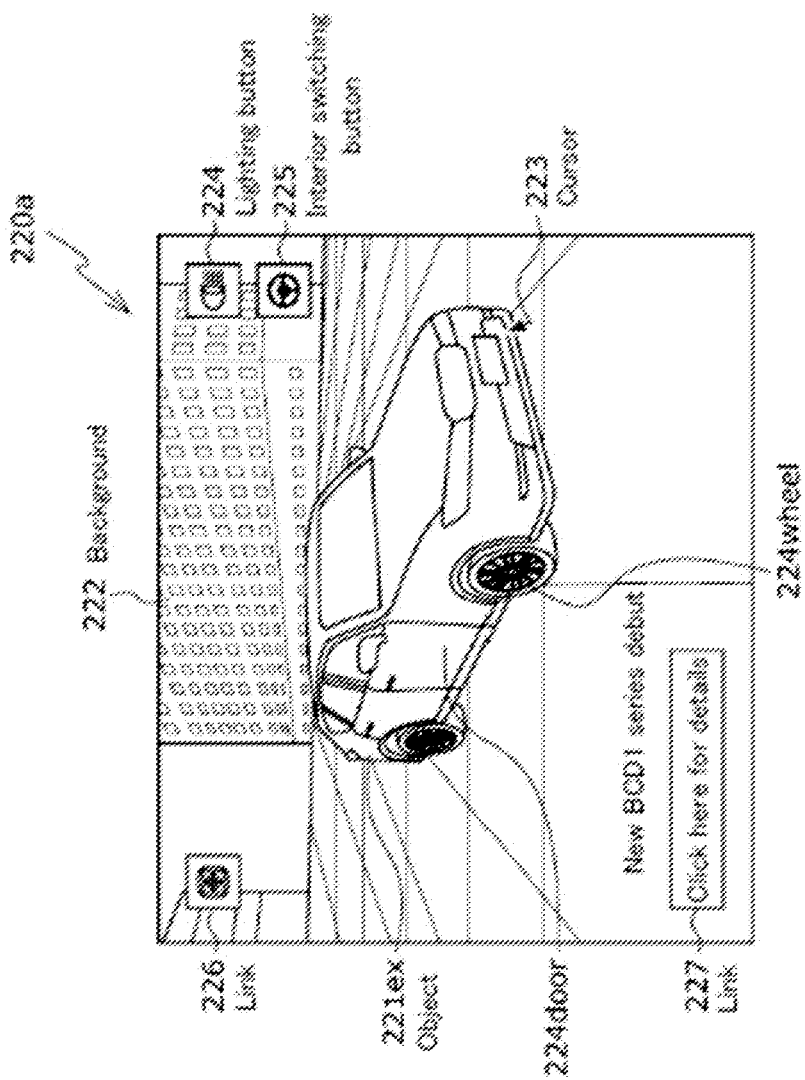
FIG. 20A illustrates an example of a screen displayed on a display section of the terminal.

As illustrated in FIG. 20A, screen 220a is a screen when the content of content information 211 is a banner advertisement of an automobile, and includes object 221ex representing the appearance of a 3D displayed operation target (automobile), background 222 on which object 221ex is arranged, cursor 223 for pointing the operation target, lighting button 224 for changing the presentation of a part of object 221ex (for lighting a front light), interior switching button 225 for switching the presentation of the operation target (automobile) to the interior, link 226 for moving to a home page of a manufacturer of the operation target, and link 227 for moving to a product page of the operation target. For example, when a drag operation is performed on screen 220a with cursor 223, the image-capturing direction for object 221ex and background 222 is changed to any direction. When a selection operation is performed on lighting button 224, interior switching button 225, link 226, or link 227, the corresponding function is turned on or off.

Figure 20B:
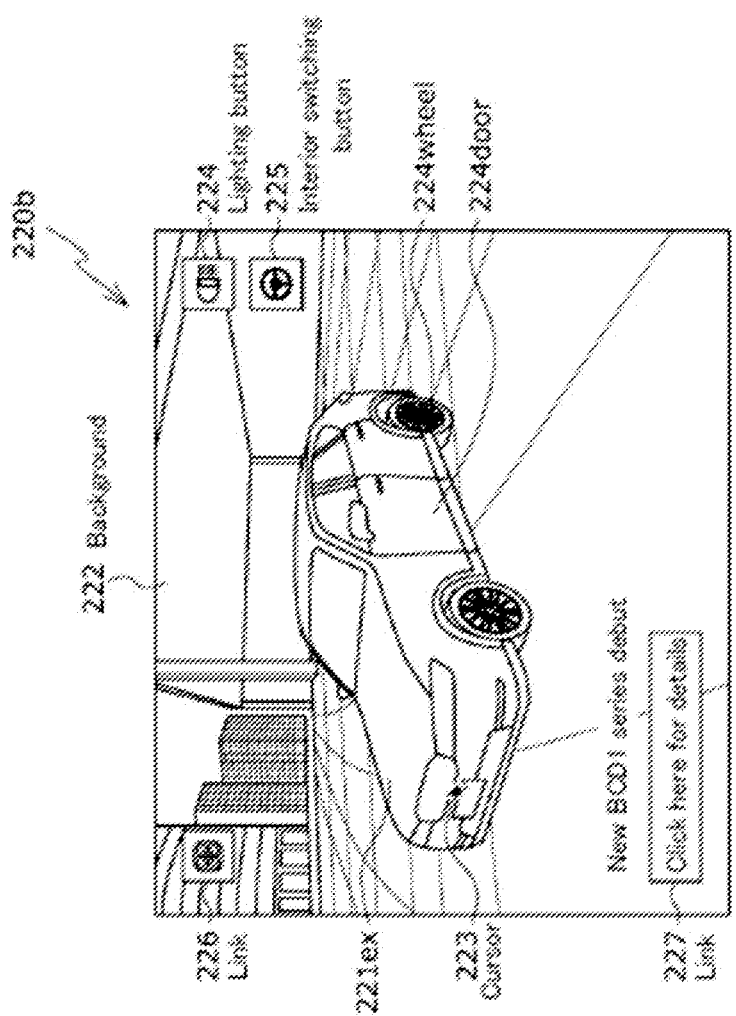
FIG. 20B illustrates an example of a screen displayed on the display section of the terminal.

As illustrated in FIG. 20B, screen 220b is a screen displayed after a horizontal drag operation with cursor 223 is performed on object 221ex in the state of screen 220a and the camera angle is changed. Object 221ex has door 224door and wheel 224wheel. When the selection operation with cursor 223 is performed on door 224door, the door is opened or closed. When the selection operation with cursor 223 is performed on wheel 224wheel, the size, color, and model of the wheel are changed to another size, color, and model.

Figure 20C:
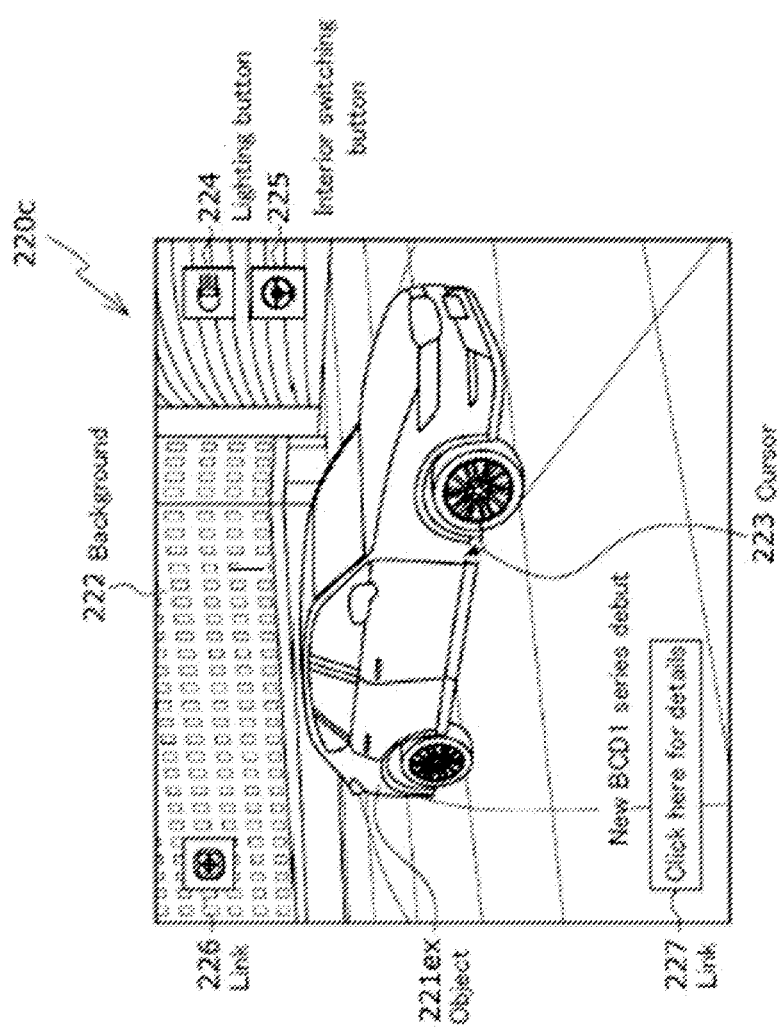
FIG. 20C illustrates an example of a screen displayed on the display section of the terminal.
Figure 20D:
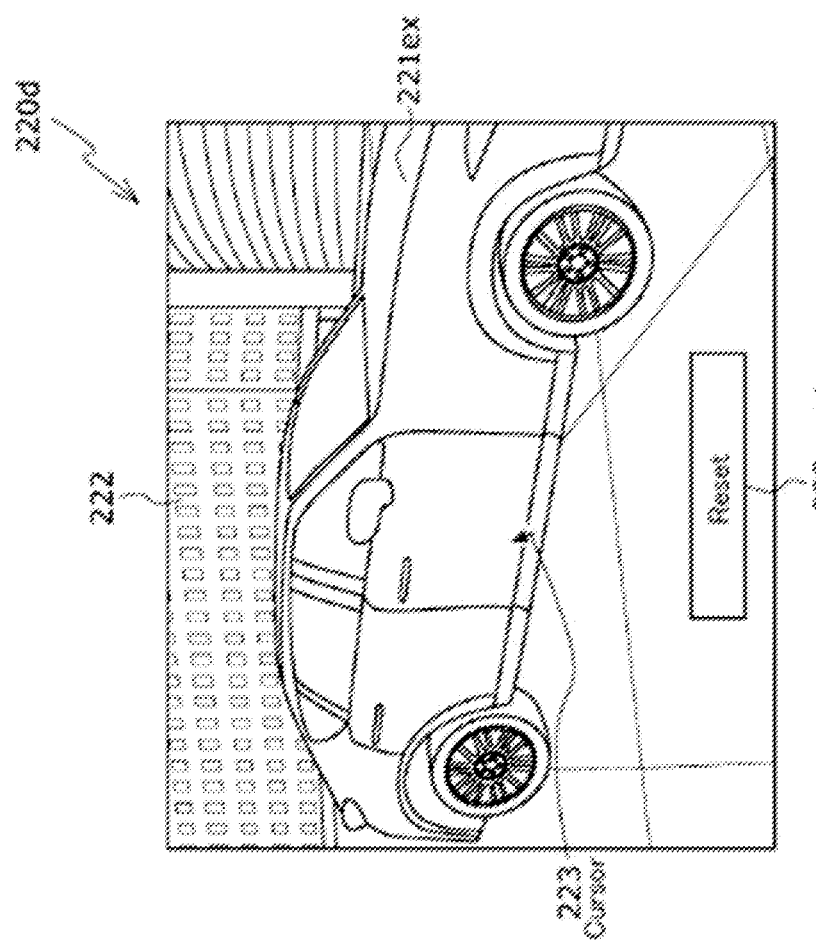
FIG. 20D illustrates an example of a screen displayed on the display section of the terminal.

Further, as illustrated in FIG. 20C, when an operation (e.g., a mouse-wheel operation, double tapping or pinching out of a touch pad, or the like) is performed while cursor 223 is positioned on screen 220b, screen 220d illustrated in FIG. 20D is displayed, in which the object is closely viewed.

Figure 20E:
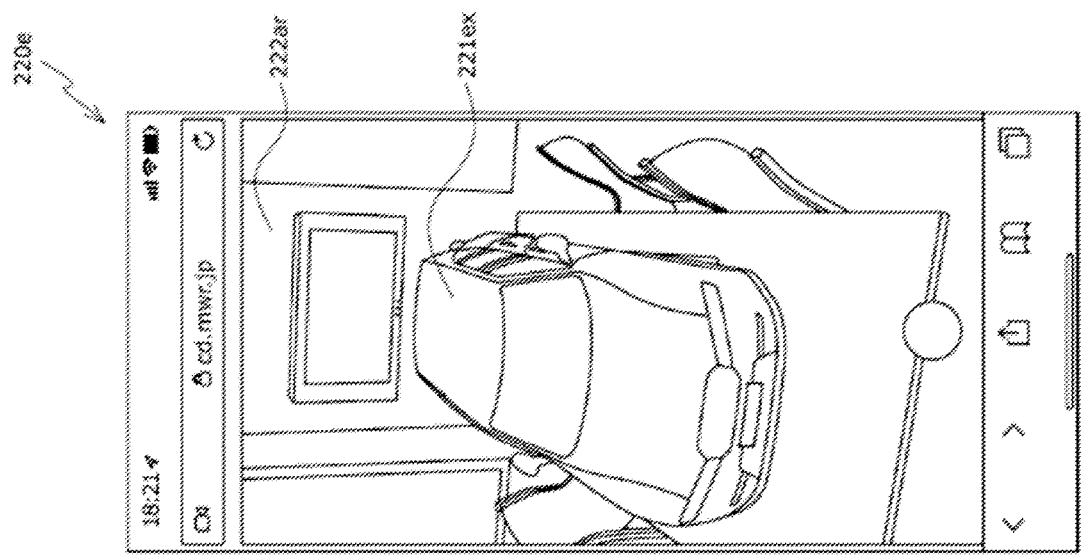
FIG. 20E illustrates an example of a screen displayed on the display section of the terminal.

As illustrated in FIG. 20E, screen 220e is a screen displayed when the Augmented Reality (AR) function is used. Object 221ex is displayed on background 222ar whose image is captured by the camera of terminal 2, such the distance and viewing angle to an arrangement plane are fitted to background 222ar.

Figure 20F:
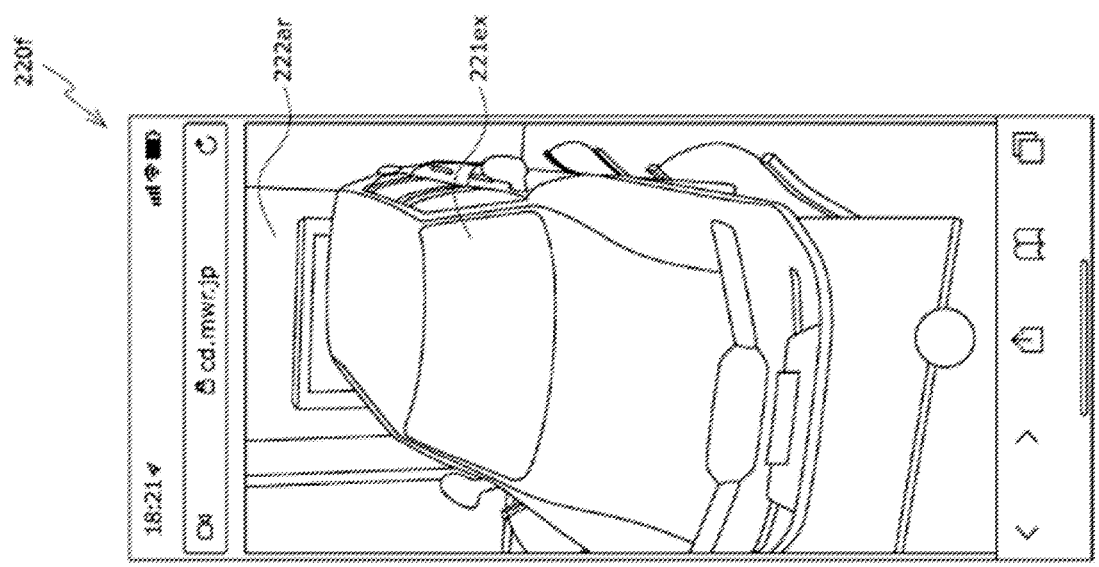
FIG. 20F illustrates an example of a screen displayed on the display section of the terminal.

As illustrated in FIG. 20F, when the operation (e.g., the mouse-wheel operation, double tapping or pinching out of the touch pad, or the like) is performed on screen 220e of FIG. 20E, object 221ex changed in size (increased in size) is displayed on screen 220f.

Figure 20G:
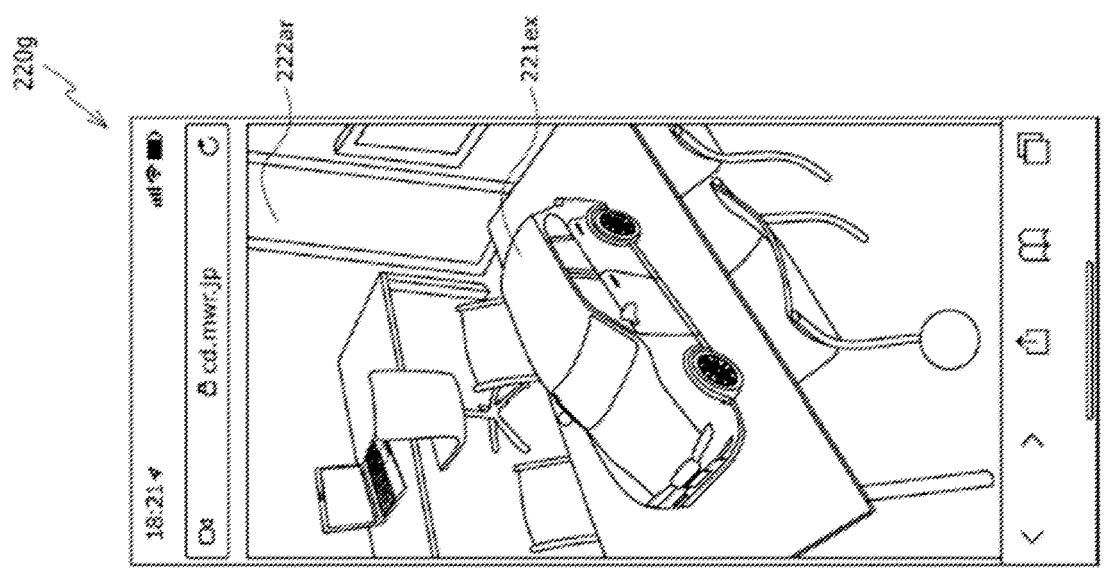
FIG. 20G illustrates an example of a screen displayed on the display section of the terminal.

Further, as illustrated in FIG. 20G, screen 220g displays object 221ex, the distance and viewing angle of which to the arrangement plane are changed in accordance with background 222*ar* in which the image-capturing position and direction of the camera of terminal 2 in screen 220*e* of FIG. 20E are changed.

Figure 20H:
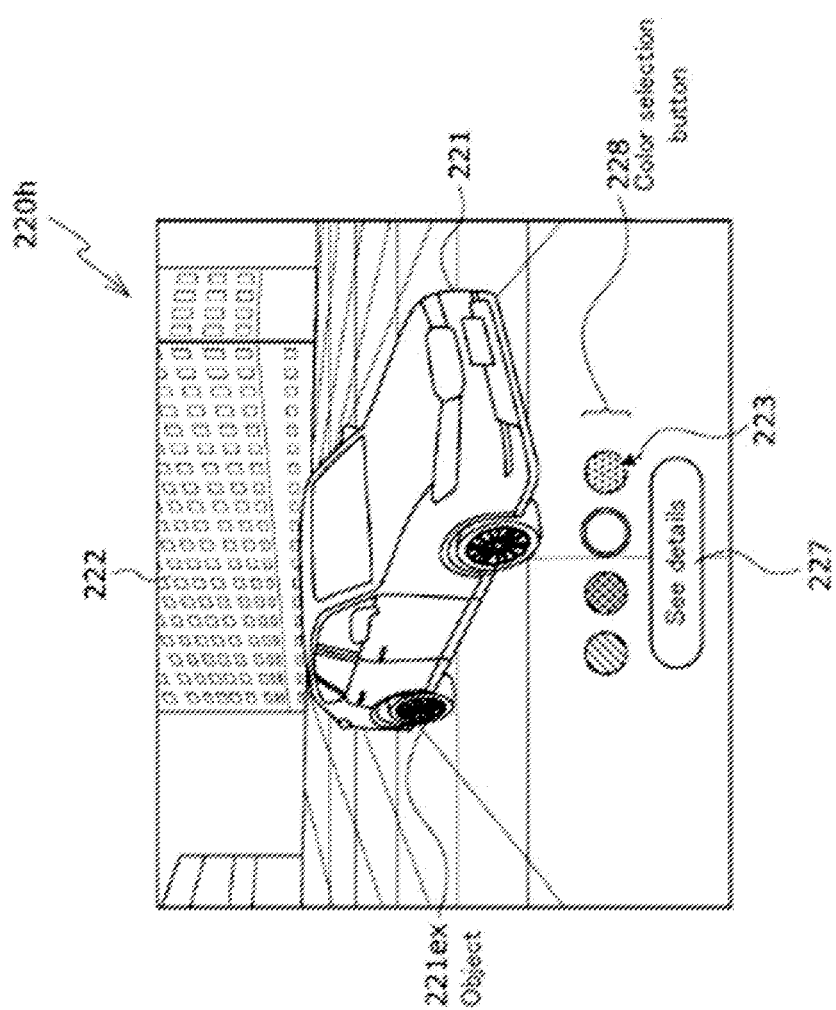
FIG. 20H illustrates an example of a screen displayed on the display section of the terminal.

As illustrated in FIG. 20H, in screen 220*h*, color selection buttons 228 are further added to screen 220*a* illustrated in FIG. 20A, and when any one of color selection buttons 228 is selected, the exterior color of object 221*ex* is changed in accordance with the selected color.

Figure 20I:
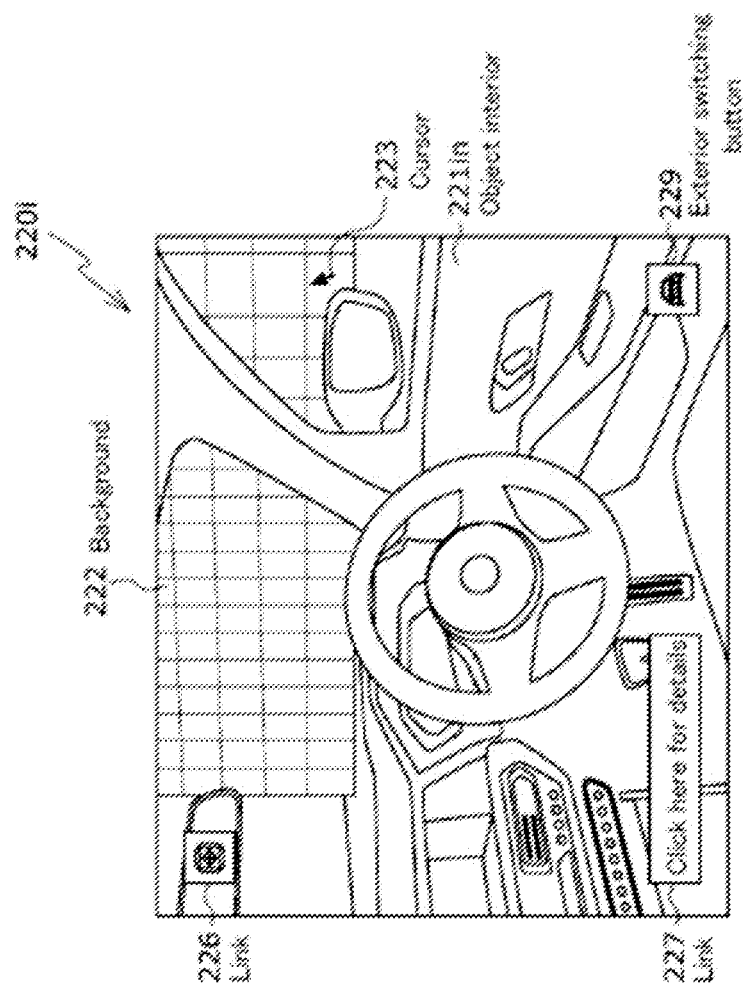
FIG. 20I illustrates an example of a screen displayed on the display section of the terminal.

As illustrated in FIG. 20I, screen 220*i* is a screen illustrating the interior of object 221*ex* when interior switching button 225 of screen 220*a* illustrated in FIG. 20A is operated, and includes object interior 221*in* and exterior switching button 229.

FIGS. 21A to 21F are explanatory views for explaining exemplary items of events.

Event 112OT illustrated in FIG. 21A is a changing event with respect to an object and, for example, includes events such as "rotate object—start" that is generated when rotation of the object is started, "rotate object—stop" that is generated when the rotation of the object is ended, "door open" that is generated when a door of the object is opened, "door close" that is generated when the door of the object is closed, "change product model" that is generated when the model of the object is changed, "change view (interior to exterior, for example)" that is generated when the view to the object is changed, "POI focus" that is generated when Point of Interest (POI) is clicked for focusing thereon, "object zoom start" that is generated when zooming the object is started, "object zoom stop" that is generated when zooming the object is ended, "other (custom)" capable of setting other operations, "change wheels" that is generated when a wheel of the object is changed, "turn on/off lights" that is generated when a light of the object is turned on or off, "change alignment" that is generated when objects are aligned, "object scale start" that is generated when changing the scale of the object is started, "object scale stop" that is generated when changing the scale is ended, and "object mirror" that is generated when the object is reversed vertically or horizontally.

Note that, for example, "color change" includes information on the color after the change and information on the color before the change. Also, "rotate object—start" and "rotate object—stop" include information on the starting and ending points of rotation, the rotation angle, the rotation angular velocity over time, and the like. Similarly, each of "object zoom start," "object zoom stop," "object scale start," and "object scale stop" includes information on the starting and ending points of the operation, the amount of change over time from the start to the end, and the like.

Event 112CT illustrated in FIG. 21B is a changing event with respect to a camera and, for example, includes events such as "object distance change—start" that is generated when changing the distance between the object and the camera is started, "object distance change—stop" that is generated when changing the distance is ended, "object direction change—start" that is generated when changing the camera direction to the object is started, "object direction change—stop" that is generated when changing the camera direction is ended, "object location change—start" that is generated when rearranging the object is started, "object location change—stop" that is generated when the rearrangement is ended, "zoom object view—start" that is generated when zooming the object with respect to the environment is started, "zoom object view—stop" that is generated when the zooming is ended, "camera rotation—start" that is generated when rotation of the camera is started, "camera rotation—stop" that is generated when the rotation is ended, and "projection matrix change" that is generated when any one or some of the position, orientation, and size of the object is changed.

Note that, each of "object distance change—start," "object distance change—stop," "object direction change—start," "object direction change—stop," "object location change—start," "object location change—stop," "zoom object view—start," "zoom object view—stop," "camera rotation—start," and "camera rotation—stop" includes information on the starting and ending points of the operation, the amount of change over time from the start to the end, and the like.

Event 112OP illustrated in FIG. 21C is a changing event with respect to object properties and, for example, includes events such as "change body color" that is generated when the color of body of the object is changed, "change trim color" that is generated when the color of trim of the object is changed, "change body texture" that is generated when the pattern of body of the object is changed, "change background" that is generated when the background is changed, "change object graphics" that is generated when the word or icon on the object is changed, "change object multimedia" that is generated when the multimedia such as a video and sound played with the object is changed, "start object animation" that is generated when an animation played with the object is started, "stop object animation" that is generated when the animation is ended, "change object animation" that is generated when the animation played with the object is changed, "start background animation" that is generated when an animation played with the background is started, "stop background animation" that is generated when the animation is ended, and "change background animation" that is generated when the animation played with the background is changed.

Figure 21D:
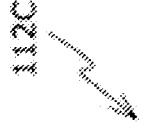
FIG. 21D is an explanatory view for explaining exemplary items of events.

Event 112CP illustrated in FIG. 21D is a changing event with respect to camera properties and, for example, includes events such as "change field of view" that is generated when the viewing angle is changed, "change overlay graphics" that is generated when an overlay image is changed, "additional 3D objects overlaid" that is generated when a 3D object to be overlaid is added, "change lighting effects" that is generated when a lighting effect is changed, and "change color filters" that is generated when a color filter is changed.

Event 112S illustrated in FIG. 21E is an event generated in a system and, for example, includes events such as "AR System loaded" that is generated when an AR system is loaded, "Assets loaded" that is generated when a material is loaded, "scene ready" that is generated when a scene is ready, "spawn object" that is generated when an object is generated, "spawn multiple objects (how many)" that is generated (with the number of objects) when multiple objects are generated, "error (AR system)" that is generated when an error (in the AR system) occurs, "timer-after-action (how much time)" that is generated (with an elapsed time) when time elapses after an action, "timer-after-impression (how much time)" that is generated (with an elapsed time) when time elapses after impression, "photo/screenshot taken" that is generated when a photo/screenshot is taken, "call to action (click to site)" that is generated when a call to action to a user is succeeded (e.g., when a link highlighted in some way (such as by a blink or an arrow) is clicked and the user moves to a website, "reset creative" that is generated when presentation of the object is reset, "launch AR mode" that is generated when an AR mode is executed, "start (video/audio multimedia)" that is generated when video/audio playback is started, "stop (video/audio multimedia)" that is generated when the playback is ended, "resume (video/audio multimedia)" that is generated when the video/audio playback is resumed, "media Quartile Complete (video/audio multimedia—1, 2, 3, 4 quarters)" that is generated when (25%|50%|75%|100%) of the total playing time is played, and "volume change (audio)" that is generated (with the volume) when the volume of audio is changed.

Note that "AR System loaded" includes the positional information of terminal 2, the information on the color, model, size, arrangement, and the like of the object when AR is executed.

Figure 21F:
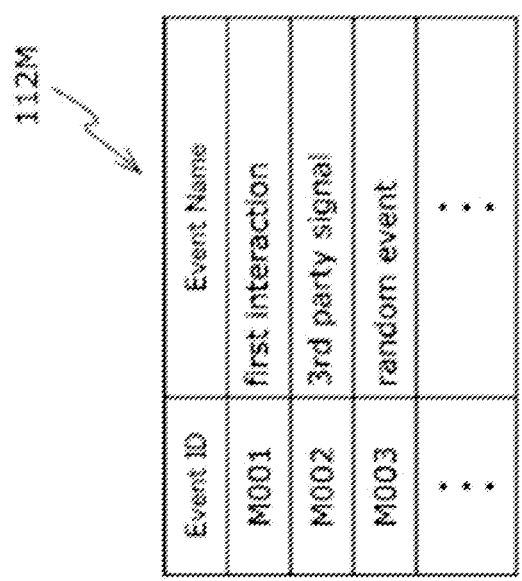
FIG. 21F is an explanatory view for explaining exemplary items of events.

Event 112M illustrated in FIG. 21F represents other events and, for example, includes events such as "first interaction" that is generated when the first interaction occurs, "3rd party signal" that is generated when content of another company used in the content information generates an event or a signal, and "random event" that is generated when a random event occurs.

FIG. 22 illustrates a configuration example of event history information 112.

Event history information 112 includes time as time stamps and event IDs of events generated at the respective times. The event IDs correspond respectively to the event IDs illustrated in FIGS. 21A to 21F. The example of FIG. 22 illustrates a history of events in a case where an AR system is loaded (S001) at time t1, an object is generated (S004) at time t2, a door of the object is opened (OT003) at time t3, rotation of the object is started (OT001) at time t4, the rotation of the object is stopped (OT002) at time t5, content of another company generates an event (M002) at time t6, a lighting effect is changed (CP004) at time t7, rotation of a camera is started (CT009) at time t8, and the rotation of the camera is stopped (CT010) at time t9 in terminal 2. In addition, although FIG. 22 illustrates a plurality of individual events simply arranged chronologically, the event of stopping the rotation of the object, like "rotate object—stop" of the event ID "OT002" illustrated in FIG. 21A, may include a detailed trajectory and timing of a rotational movement of the object in one event, for example. In this case, any time during the event may be included as its time stamp, or no time stamp may be included.

Operation of Information Processing Apparatus

Next, the effects of the present embodiment will be described in the sections (1) Content Display Operation, (2) Event History Analysis Operation, and (3) Analysis Result Output Operation.

(1) Content Display Operation

Figure 26:
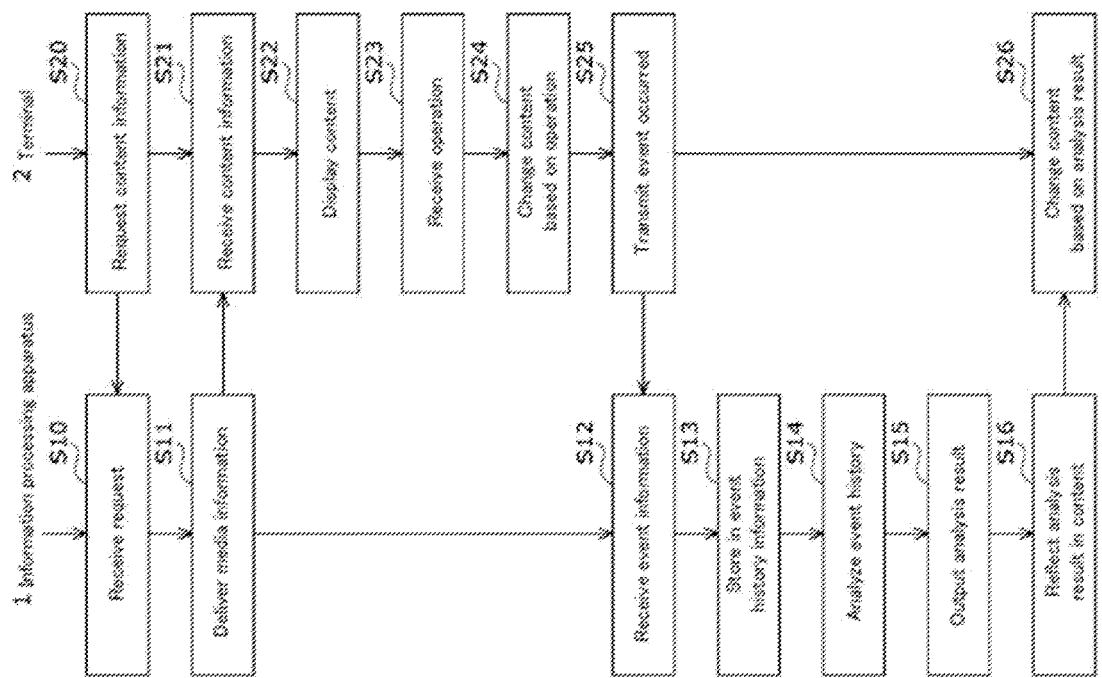
FIG. 26 is a flowchart illustrating an operation example of the information processing system.

FIG. 26 is a flowchart illustrating an operation example of information processing system 5.

To begin with, user 6 of terminal 2 operates terminal 2 to browse a home page including content. Terminal 2 requests information on the home page from a server delivering the information on the home page and receives the information, and a web browser of terminal 2 displays the content of the home page based on the received information, and transmits, to information processing apparatus 1, a request for content information based on a URL of the content information included in the received information on the home page (S20).

Content delivery means 100 of information processing apparatus 1 receives a delivery request of terminal 2 (S10), and delivers content information 111 together with the information on the home page to terminal 2 through communication section 12 and network 4 (S11).

Via communication section 25 and network 4, content reception means 200 of terminal 2 receives content information 111 delivered from information processing apparatus 1, and stores content information 111 in storage section 21 as content information 211 (S21).

Next, content display means 201 of terminal 2 executes content information 211 to display the content information as a banner advertisement within the home page (S22). The displayed contents of the banner advertisement are composed of the contents illustrated in FIGS. 20A to 20C, 20H, and 20I.

User 6 confirms the displayed contents (FIGS. 20A to 20I) of content information 211 displayed on display section 22 of terminal 2, and performs an operation on operation section 23 in order to change object 221ex, the camera angle, and/or the like included in the displayed contents.

Content operation reception means 202 of terminal 2 receives the operation on operation section 23 (S23), and converts an operational content into an operational content corresponding to the execution state of content information 211. In accordance with the operational content of the operation received by content operation reception means 202, content display means 201 of terminal 2 changes the displayed contents such as object 221ex and the camera angle displayed on display section 22 (S24).

Further, content operation reception means 202 of terminal 2 generates an event (FIGS. 21A to 21F) corresponding to the execution state, and event transmission means 203 transmits the generated event together with the time stamp to information processing apparatus 1 as event history information 212 (FIG. 22) (S25). Event history information 212 may be a single event or may include a plurality of events. The timing of transmission to information processing apparatus 1 may be periodic. A defined amount of transmission may be performed, or the amount of transmission may be changed based on the connection state of the network.

Event reception means 101 of information processing apparatus 1 receives the event from terminal 2 (S12), and stores the received event in storage section 11 as event history information 112 (S13).

Event analysis means 102 of information processing apparatus 1 analyzes event history information 112 to generate analysis result information 113 (S14). The analysis method will be described below.

(2) Event History Analysis Operation (First Stage Analysis)

As a first stage analysis, event analysis means 102 tracks an individual event from event history information 112 to obtain an analysis result. The analysis result includes, for example, the number of events per campaign, the average of events per session, the rate of engagement derived from the ratio of (the number of sessions with one or more interactions)/(the total number of sessions) (this value represents an index indicative of how many users have been connected to a product), and the cost per engagement derived from the ratio of (total campaign cost)/(total number of sessions for engagement).

The terms used herein are terms used in web analytics, such as Google analytics, for example, and the "campaign" is an activity aiming at inviting users from a banner advertisement to an advertiser site, the "session" is a series of actions performed since a visit of a user to the advertiser site until leaving the advertiser site, and the "engagement" is a term indicating the depth of user's interest in the advertised product.

By way of example, when eight types of events (impressions, rotations, light changes, interior view switches, calls to action, zooms (in/out), resets, and time-after-actions) are generated, event analysis means 102 can further use the value "interactions" obtained by totaling all events in the engagement time, which is a measured time of all interactions in a single session. These events are totaled on a time-period basis, i.e., on a daily basis, on a campaign-by-campaign basis, and on a session-by-session basis. That is, 27 kinds of totaling results are obtained as the analysis result from three time-period bases with respect to nine totaling units.

(Second Stage Analysis; Combination)

Next, as a second stage analysis, event analysis means 102 obtains the analysis result by tracking, from event history information 112, combinations of individual events having occurred. For example, a combination in which a user is interested is selected from among the types of event combinations obtained by using combinations represented by Equation 1 below. Here, n is the number of event types and k is the number of events selected as combinations.

[1]

$$_nC_k = \frac{n!}{k!(n-k)!}$$ (Equation 1)

By way of example, when eight types of events (impressions, rotations, light changes, interior view switches, calls to action, zooms (in/out), resets, and time-after-actions) are generated as in the first stage analysis, event analysis means 102 can further use interactions, and the number of combinations of two events is 36. Thus, many types of analysis results can be obtained. For a combination selected from among arbitrary combinations of these events, event analysis means 102 outputs, as the analysis result, the number of combinations of multiple events, average, rate, ratio, cost, and the like. For example, when the combination of impressions and Calls to Action (CTA) (e.g., clicks) is outputted as the analysis result, CTR (the click-through-rate of clicks) is obtained.

(Second Stage Analysis; Permutation)

Next, as the second stage analysis, event analysis means 102 obtains the analysis result by tracking, from event history information 112, the order of individual events having occurred. For example, a permutation in which a user is interested is selected from among the types of permutations of events obtained by using permutations represented by Equation 2 below. Here, n is the number of event types and k is the number of events selected as permutations.

[2]

$$_nP_k = \frac{n!}{(n-k)!}$$ (Equation 2)

For example, the number of permutations of "impression>choose size or choose color or choose model (in any order)>CTA (click)" is 6. By counting the number of permutations, event analysis means 102 outputs, as the analysis result, which of the size, color, and model user 6 is the most interested in.

Note that, by way of example, when six types of events are generated, the number of permutations is greater than 1,900 (that is the sum of the following numbers of permutations: the number of permutations of two from among six types of events is 30, the number of permutations of three from among six types of events is 120, the number of permutations of four form among six types of events is 360, the number of permutations of five form among six types of events is 720, and the number of permutations of six form among six types of events is 720). The order of events meaningful to advertiser 7 may be extracted using a big data analytics technique or the like.

Further, event analysis means 102 defines the time elapsed after an operation, "timer after action," and the time elapsed after impression, "timer after impression," as events (FIG. 21E), thus increasing the number of permutations further by introducing the concept of time in the permutations described above.

In addition, event analysis means 102 outputs the number of permutations of multiple events, average, rate, ratio, cost, and the like as the analysis result.

(Second Stage Analysis; Repeated Permutation)

Next, as the second stage analysis, event analysis means 102 obtains the analysis result by tracking, from event history information 112, the frequencies and order of individual events having occurred, when the individual events may occur repeatedly. For example, a permutation in which the user is interested in is selected from among a number of permutations obtained by using the equation illustrated as Equation 3 below. Here, n is the number of event types and t is the total number of generated interactions.

Equation 3

$$_nPR_t = n^t$$ (3)

Note that, by way of example, when seven types of events are generated and five events occur repeatedly, the number of repeated permutations is 16,000 or greater. When there is no limit on the number of events, the number of repeated permutations increases exponentially.

For example, for the repeated permutations of "impression, rotate start or rotate stop or color change or zoom start or zoom stop or view POI or reset, launch AR mode, spawn object, change lighting effects or change color or rotate start or zoom start or zoom stop," event analysis means 102 counts the number of these events to output, as the analysis result, which point user 6 is interested in and what kind of object arrangement in the AR mode user 6 is interested in.

In addition, event analysis means 102 outputs the number of repeated permutations of multiple events, average, rate, ratio, cost, and the like as the analysis result.

(3) Analysis Result Output Operation

Analysis result output means 103 of information processing apparatus 1 outputs analysis result information 113 to terminal 3 in response to a request of terminal 3 (S15). As will be described later, advertiser 7 confirms the advertising effect, the behavioral (preferential) tendency, and the like of user 6 from the analysis result displayed on the display section of terminal 3.

Figure 23:
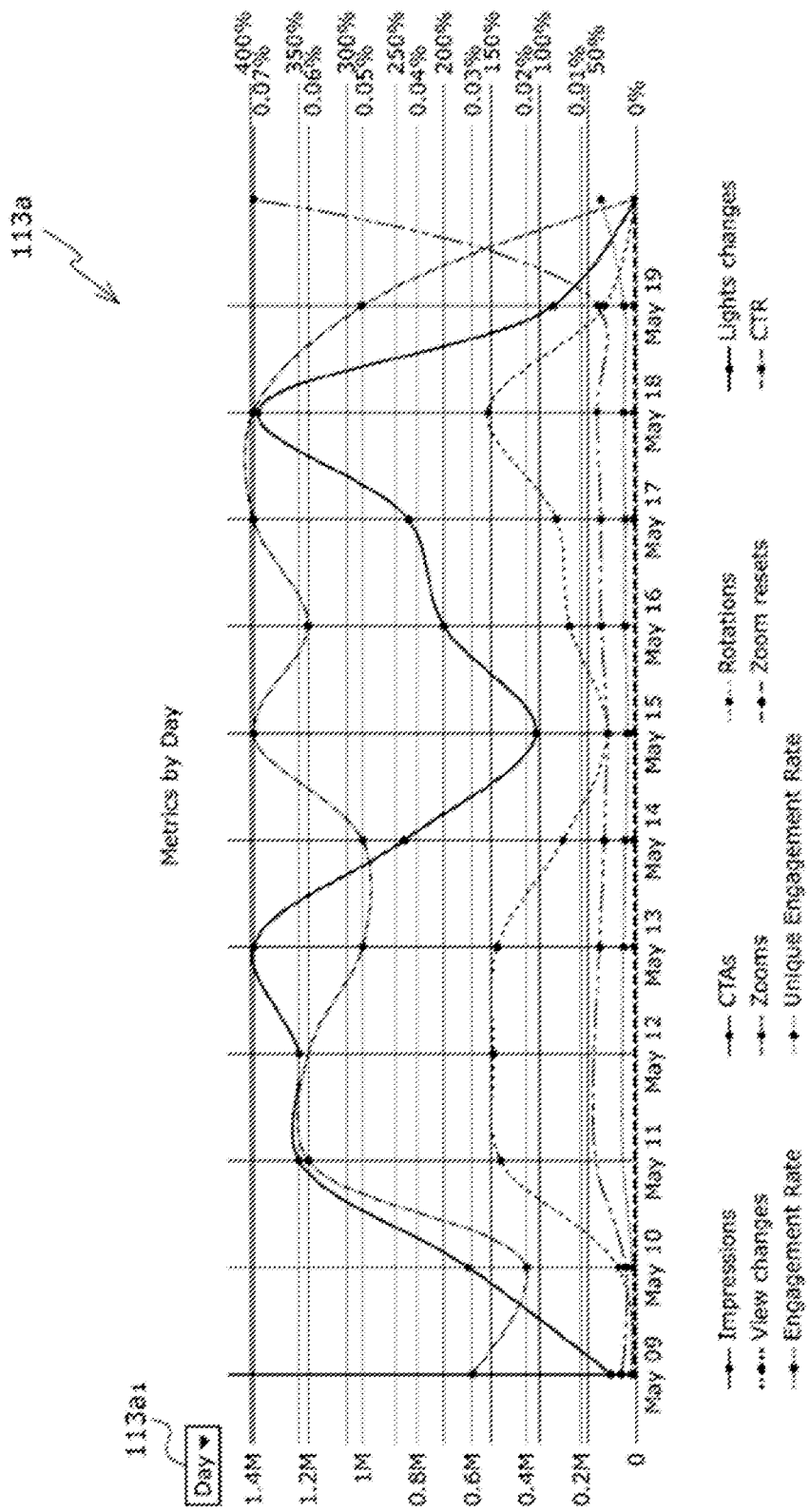
FIG. 23 illustrates an example of a screen displayed on the display section of the terminal based on analysis result information.

FIG. 23 illustrates an example of a screen displayed on the display section of terminal 3 based on analysis result information 113.

Analysis result display screen 113a displays the analysis result information obtained by the first stage analysis, and includes the trends of Impressions, Calls to Action (CTAs), Rotations, Lights changes, View changes, Zooms, Zoom resets, Click Through Rate (CTR), Engagement Rate, and Unique Engagement Rate. Note that, the CTA is, for example, the number of times a process for a call to action such as an animation that prompts an operation by a user in a banner advertisement is executed, the number of times a link is clicked for the user to move to a linked website, or the like. In addition, these presentations are grouped on a daily basis, and can also be grouped, for example, on a monthly, annual, hourly, campaign-by-campaign, or session-by-session basis by changing unit change menu 113a1.

Figure 24:
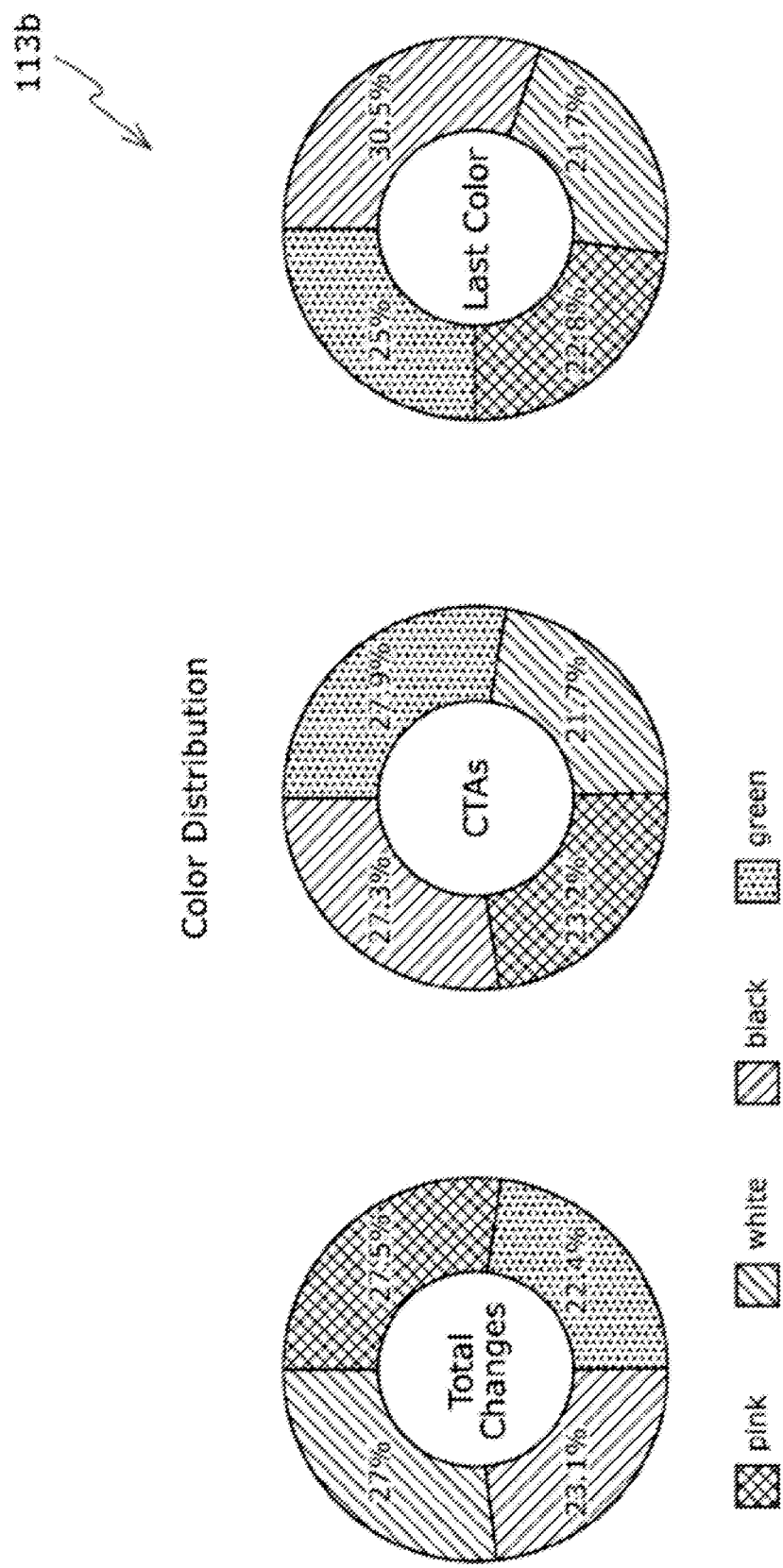
FIG. 24 illustrates an example of a screen displayed on the display section of the terminal based on the analysis result information.

FIG. 24 illustrates an example of a screen displayed on the display section of terminal 3 based on analysis result information 113.

Analysis result display screen 113b displays the analysis result information obtained by the first stage analysis, illustrates the color distributions of the body color of the vehicle, and includes, from the left, Total Changes indicating the rate of total number of times each color is selected regardless of a situation, CTAs indicating the rate of the selected color when the link is clicked, and Last Color indicating the rate of the last selected color.

Figure 25:
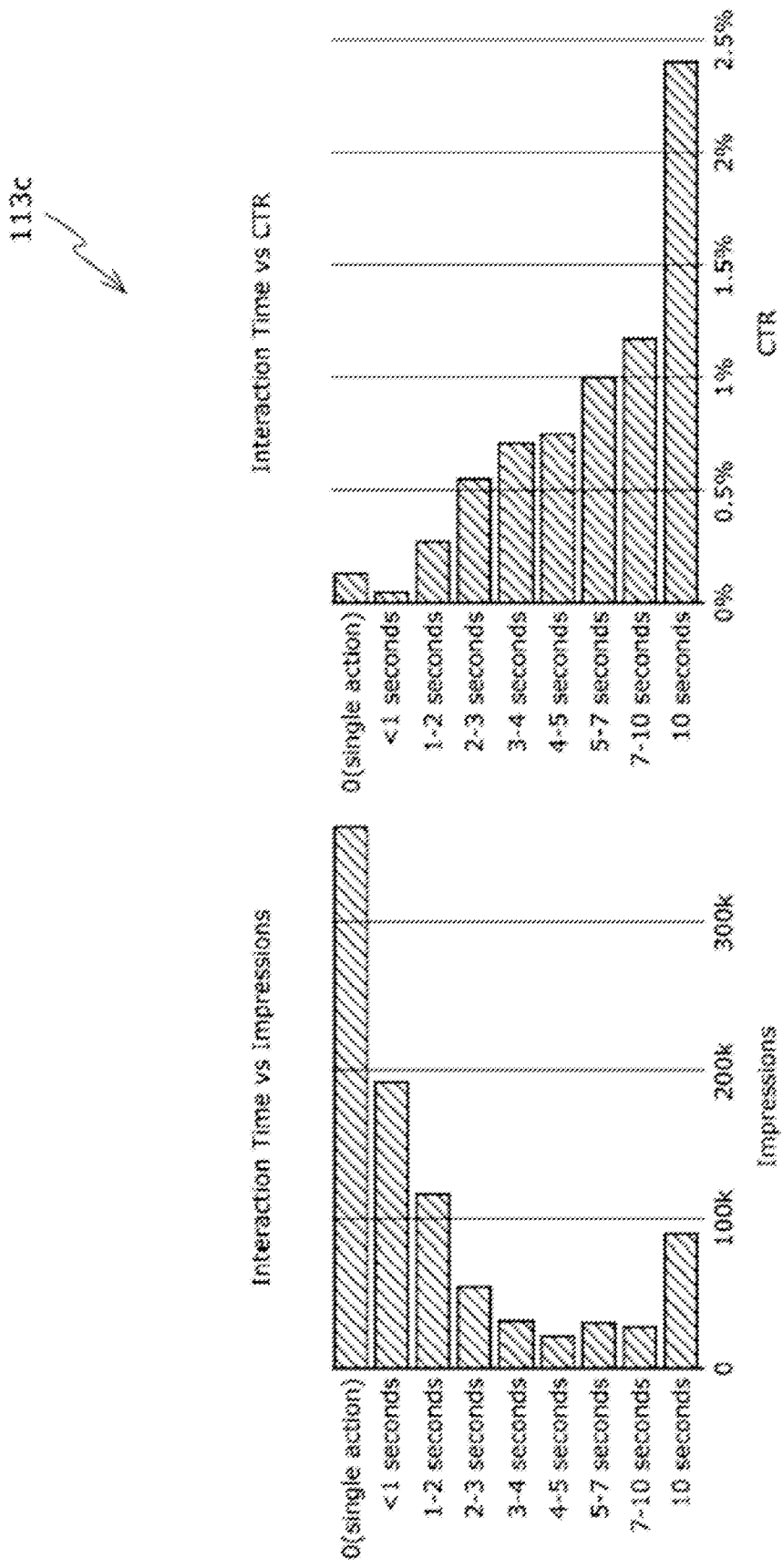
FIG. 25 illustrates an example of a screen displayed on the display section of the terminal based on the analysis result information.

FIG. 25 illustrates an example of a screen displayed on the display section of terminal 3 based on analysis result information 113.

Analysis result display screen 113c displays the analysis result information obtained by the second stage analysis, and includes Interaction Time vs Impressions on the left side and Interaction Time vs CTR on the right side.

Interaction Time vs Impressions illustrates the distribution of the total numbers of impressions over a specified time period (for all users) relative to the time between the time stamp of the first interaction and the time stamp of the last interaction in a certain session (for a specific user). Note that, Interaction Time=0 means a case where the Assets loaded event is not counted as the interaction, and only one event occurs thereafter. The others of Interaction Time are the intervals between the time stamps of the first and last events when several events other than Assets loaded occur.

Interaction Time vs CTR illustrates the distribution of CTRs (of all users) relative to the time between the time stamp of the first interaction and the time stamp of the last interaction in a certain session (for a specific user). Note that Interaction Time=0 means a case where the Assets loaded event is not counted as the interaction, and only the Call to Action (click to website) event occurs thereafter. The others of Interaction Time are the intervals between, on one hand, the first time stamp of an event other than Assets loaded having occurred and, on the other hand, the Call to Action (click to website) event.

In addition, analysis result reflection means 104 of information processing apparatus 1 requests terminal 2 to change the contents of the content information based on analysis result information 113 (S16).

Media update means 204 of terminal 2 changes the initial setting values of the color, model, image-capturing angle, arrangement angle, option, and the like of content information 211 in accordance with the contents of the request of analysis result reflection means 104 of information processing apparatus 1. For example, when the rate of red is larger in the result of selection of the color of the object, measures such as changing the initial setting color of the object to red to reflect the tendency of a plurality of users are possible.

Analysis result reflection means 104 of information processing apparatus 1 may change the contents of content information 111 based on analysis result information 113. Analysis result information 113 to be reflected may be based on events of a single user or may be based on events of a plurality of users.

Effect of Embodiment

According to the above-described embodiment, an advertisement banner displayed at the terminal is displayed so as to be operable and an event generated based on the operation is analyzed. Thus, regarding content displayed so as to be operable by the user, it is possible to analyze the user's interest, behavioral tendency, and/or the like from an operational content. In particular, conventionally, only the number of times of delivery (number of impressions), the presence or absence of clicks (CTR), and the like were analyzable. In the present embodiment, the combinations, permutations, and repeated permutations of events are used. It is thus possible to obtain more information than was conventionally possible, and to identify more complicated operational contents so as to analyze the number, rate, average, and the like of the operational contents in order to identify the user's interest and behavioral tendency.

Further, it is possible to present the analysis result to advertiser 7 using a graph or a table. In addition, a large amount of information is obtainable, a large number of analysis methods are available, and a display method is changeable as appropriate. Accordingly, it is possible to select analysis results and display methods suitable to an advertiser, an advertisement analyzer, an advertising industry, a webpage/application creator, a manager of an electronic commerce brand, a manager of an electronic commerce site, a person in a distribution industry, and the like.

Further, the number of times, rate, average, and the like obtained from the analysis result for a specific user or a plurality of users can be dynamically reflected in the initial setting values of the color, model, image-capturing angle, arrangement angle, option, and the like of the content. In addition, a product to be introduced to a specific user may be changed based on the analysis result for the user. In addition, products introduced may be of the same advertiser or of different manufacturers. Further, content of an advertisement medium (printed matter, e-mail, or the like) other than the banner advertisement may be changed based on the number of times, rate, average, and the like obtained by the analysis result for a specific user or a plurality of users.

As the above-described method of analyzing the interest of the user, an A/B test can be conducted, for example. The conventional A/B test needs two comparison targets to be presented to a user, thus requiring at least two impressions. In the present embodiment, both A and B for a plurality of colors, models, image-capturing angles, and the like can be incorporated in one content. Thus, it is only necessary to deliver one content for presenting a plurality of conditions, and the amount of information obtainable by one impression increases. That is, the A/B test can be conducted in one content.

As an exemplary modification of outputting the analysis result, a store in which a product with specifications desired to be purchased by a specific user is stored can, for example, be introduced based on the analysis result for the user. In addition, by sending the analysis result for a plurality of users to a manufacturer, it is possible to increase the number of manufactures of the product with the specifications desired to be purchased by a plurality of users, or to deliver the product with the specifications to an area where a large number of users desire to purchase the product.

As an exemplary modification of outputting the analysis result, for example, when a series of events having a certain regularity is detected based on an analysis result for a plurality of users, a user who generated the series of events can be specified as a bot (software for performing simple repetitive tasks), and the events generated by the bot can, for example, be excluded from the totaling process.

In addition, in an exemplary modification of outputting the analysis result, the analysis result is based not only on impressions but also on an event generated by an operation performed on an object, for example. Thus, by selecting only a series of events accompanying the operation, it is possible to output, as the analysis result, numerical values guaranteeing that a user has viewed a banner advertisement.

Conventional methods for evaluating banner advertisements were based only on impressions and/or clicks, or on numerical values (CTRs or the like) based on these impressions and/or clicks. Therefore, in many cases, the cost paid by advertiser 7 was based on the number of impressions. The present invention allows evaluation of a banner advertisement based on engagements. It is thus possible to make the cost paid by advertiser 7 suitable to the advertising effect.

Other Embodiments

Note that the present invention is not limited to the above-mentioned embodiment, and various modifications are possible without departing from the spirit of the present invention.

In the above-described embodiment, the functions of respective means 100 to 104 of control section 10 and means 200 to 204 are implemented by the programs. However, all or a part of the means may be implemented by hardware such as an ASIC. The programs used in the above embodiment can also be provided by being stored in a recording medium such as a CD-ROM. In addition, replacement, deletion, addition, and the like of the above steps described in the above embodiment are possible without departing from the gist of the present invention.

SUMMARY OF THE DISCLOSURE

Some examples are appended below as a summary of this disclosure.

(Disclosure 1-1) A method according to the disclosure for sending at least one 3D object from a server to a client, includes: extracting color information, alpha information and geometry information from the 3D object on the server: simplifying the geometry information; and encoding and sending a stream including the color information, the alpha information and the simplified geometry information from the server to the client.

(Disclosure 1-2) The method according to the disclosure, wherein the simplifying the geometry information is to convert cloud of points extracted from 3D object to information of vertex of triangles.

(Disclosure 1-3) The method according to the disclosure, wherein the stream further includes at least one of a metadata, a sound data, and a command.

(Disclosure 1-4) The method according to the disclosure, wherein the server receives a command from the client to redraw the 3D object on the server.

(Disclosure 1-5) The method according to the disclosure, wherein when the server receives a command from the client to redraw the 3D object, the server redraws the 3D object on the server, extracts the color information, the alpha information and the geometry information from the redrawn 3D object: simplifies the geometry information; and encode and sends a stream including the color information, the alpha information and the simplified geometry information of the redrawn 3D object from the server to the client.

(Disclosure 1-6) The method according to the disclosure 1 or 2, the color information and the alpha information are captured by an RGB camera and the geometry information is captured by at least one depth camera.

(Disclosure 1-7) A method according to the disclosure for representing a 3D object on a client, includes: receiving from the server, an encoded stream including color information, alpha information and geometry information of the 3D object: decoding the encoded stream and extracting the color information, the alpha information and the geometry information from the stream: reproducing a shape of the 3D object based on the geometry information; and projecting the information combining the color information and the alpha information on the shape of the 3D object to reconstruct the 3D object.

(Disclosure 1-8) The method according to the disclosure, further including displaying the reconstructed 3D object on a display device.

(Disclosure 1-9) The method according to the disclosure, the display device is a smart glasses or a headset.

(Disclosure 1-10) A server according the disclosure includes at least one processor and a memory, the at least one processor by executing instructions store in the memory, to extract color information, alpha information and geometry information from the 3D object on the server: simplify the geometry information; and encode and send a stream including the color information, the color information, the alpha information and the simplified geometry information from the server to a client.

(Disclosure 1-11) A client according to the disclosure includes at least one processor and a memory, the at least one processor by executing instructions stored in the memory, to receive from the server, an encoded stream including color information, alpha information and geometry information of the 3D object: decode the encoded stream and extract the color information, the alpha information and the geometry information from the stream: reproduce a shape of the 3D object based on the geometry information; and project the information combining the color information and the alpha information on the shape of the 3D object to reconstruct the 3D object.

(Disclosure 1-12) A computer program includes instructions by a processor to execute the method according to any one of the disclosure.

(Disclosure 2-1) An event analysis program according to the disclosure for causing a computer to function as: an event reception means that receives an event and stores the event and a time series together as event history information, the event occurring as a result of a change in an object displayed by display processing performed by execution of content information by a terminal, a change in a camera that virtually captures an image of the object for the display processing of the object, or a change in an object property of the object, the change being based on an operation received at the terminal, the object being displayed in a three- or higher-dimensional space or in a space in augmented reality, virtual reality, mixed reality, substitutional reality, or extended reality: an analysis means that analyzes an operational content of the operation received at the terminal using at least one of a frequency, a sum, an average, a difference, a multiplication value, a rate, a ratio, and a combination thereof of any event of the event history information; and an analysis result output means that outputs an analysis result of the analysis means.

(Disclosure 2-2) An event analysis program according the disclosure for causing a computer to function as: an event reception means that receives an event and stores the event and a time series together as event history information, the event occurring as a result of a change in presentation of content information on which display processing is performed by execution of the content information by a terminal, the change being based on an operation received at the terminal: an analysis means that analyzes an operational content of the operation received at the terminal using at least one of a frequency, a sum, an average, a difference, a multiplication value, a rate, a ratio, a permutation, and a combination thereof of any event of the event history information; and an analysis result output means that outputs an analysis result of the analysis means.

(Disclosure 2-3) An event analysis program according to the disclosure for causing a computer to function as: an event reception means that receives an event and stores the event and a time series together as event history information, the event occurring as a result of a change in presentation of content information on which display processing is performed by execution of the content information by a terminal, the change being based on an operation received at the terminal: an analysis means that analyzes an operational content of the operation received at the terminal using at least one of a frequency, a sum, an average, a difference, a multiplication value, a rate, a ratio, a repeated permutation, and a combination thereof of any event of the event history information; and an analysis result output means that outputs an analysis result of the analysis means.

(Disclosure 2-4) The event analysis program according to the disclosure, wherein the analysis means analyzes, using a combination of pieces of the event history information, the operational content of the operation received at the terminal.

(Disclosure 2-5) The event analysis program according to the disclosure, wherein the analysis result output means outputs the analysis result to the terminal to change, based on the analysis result, the presentation of the content information executed by the terminal.

(Disclosure 2-6) An information processing apparatus according the disclosure, comprising: an event reception means that receives an event and stores the event and a time series together as event history information, the event occurring as a result of a change in an object displayed by display processing performed by execution of content information by a terminal, a change in a camera that virtually captures an image of the object for the display processing of the object, or a change in an object property of the object, the change being based on an operation received at the terminal, the object being displayed in a three- or higher-dimensional space or in a space in augmented reality, virtual reality, mixed reality, substitutional reality, or extended reality: an analysis means that analyzes an operational content of the operation received at the terminal using at least one of a frequency, a sum, an average, a difference, a multiplication value, a rate, a ratio, and a combination thereof of any event of the event history information; and an analysis result output means that outputs an analysis result of the analysis means.

(Disclosure 2-7) A system according the disclosure, comprising: a terminal that outputs an event occurring as a result of a change in an object displayed by display processing performed by execution of content information, a change in a camera that virtually captures an image of the object for the display processing of the object, or a change in an object property of the object, the change being based on an operation received at the terminal, the object being displayed in a three- or higher-dimensional space or in a space in augmented reality, virtual reality, mixed reality, substitutional reality, or extended reality; and an information processing apparatus including an event reception means that receives the event from the terminal and stores the event and a time series together as event history information, an analysis means that analyzes an operational content of the operation received at the terminal using at least one of a frequency, a sum, an average, a difference, a multiplication value, a rate, a ratio, and a combination thereof of any event of the event history information, and an analysis result output means that outputs an analysis result of the analysis means.

(Disclosure 2-8) An event analysis program according the disclosure for causing a computer to function as: an event transmission means that transmits an event and a time series together as event history information, the event occurring as a result of a change in an object displayed by display processing performed by execution of content information, a change in a camera that virtually captures an image of the object for the display processing of the object, or a change in an object property of the object, the change being based on an operation received at a terminal, the object being displayed in a three- or higher-dimensional space or in a space in augmented reality, virtual reality, mixed reality, substitutional reality, or extended reality; and an update means that receives an analysis result from a transmission destination for the event history information and updates a content of the content information based on the analysis result, the analysis result being a result of analysis on an operational content received, the analysis being performed using at least one of a frequency, a sum, an average, a difference, a multiplication value, a rate, a ratio, and a combination thereof of any event of the event history information.

(Disclosure 2-9) An information processing apparatus according to the disclosure, comprising: an event transmission means that transmits an event and a time series together as event history information, the event occurring as a result of a change in an object displayed by display processing performed by execution of content information, a change in a camera that virtually captures an image of the object for the display processing of the object, or a change in an object property of the object, the change being based on an operation received at a terminal, the object being displayed in a three- or higher-dimensional space or in a space in augmented reality, virtual reality, mixed reality, substitutional reality, or extended reality; and an update means that receives an analysis result from a transmission destination for the event history information and updates a content of the content information based on the analysis result, the analysis result being a result of analysis on an operational content received, the analysis being performed using at least one of a frequency, a sum, an average, a difference, a multiplication value, a rate, a ratio, and a combination thereof of any event of the event history information.

This disclosure may be implemented in software, hardware, or software in conjunction with hardware.

This application is entitled to and claims the benefit of Japanese Patent Application No. 2021-037507 filed on Mar. 9, 2021, the disclosure of which including the specifications, drawings and abstracts are incorporated herein by reference in their entirely.

INDUSTRIAL APPLICABILITY

The present disclosure is applicable to software, programs, systems, devices, client-server systems, terminals, and the like.

REFERENCE SIGNS LIST

1: Information processing apparatus
2: Terminal
3: Terminal
4: Network
5: Information processing system 6: User
7: Advertiser
10: Control section
11: Storage section
12: Communication section
20: Control section
21: Storage section
22: Display section
23: Operation section
24: Imaging section
25: Communication section
100: Content delivery means
101: Event reception means
102: Event analysis means
103: Analysis result output means
104: Analysis result reflection means
110: Event analysis program
111: Content information
112: Event history information
113: Analysis result information
200: Content reception means
201: Content display means
202: Content operation reception means
203: Event transmission means
204: Media update means
210: Event analysis program
211: Content information
212: Event history information
1-100 Server
1-101 Received Data Processing Unit
1-102 3D scene data creation unit
1-103 Extraction unit
1-104 3D Stream Conversion/Encoding Unit
1-105 3D Stream
1-106 Network packet construction unit
1-107 Network packet transmission unit
1-108 Network packet reception unit
1-120 Wired or wireless network
1-150 Client
1-150-1 Client
1-150-2 Client
1-151 Network packet transmission unit
1-152 Network packet reception unit
1-153 Application data output unit
1-154 3D stream decoding unit
1-155 3D scene reconstruction unit
1-156 Display unit
601 CPU/GPU
602 Display unit
603 Input/output unit
604 Memory
605 Networking interface
606 Storage unit
607 Bus
603 Input/output unit
704 Memory
705 Networking interface
706 Storage unit
707 Bus
1201 Screen
1202 Person
1203 Container stream
1210 Smart glasses
1211-1 Person
1211-2 People
1212-1 Cursor
1212-2 Cursor
1213 Command
1214 Person
1221 Terminal device
1521 to 1526 Depth camera
1530 RGB camera

The invention claimed is:

1. A method for analyzing an input by a user received by a client on a server; the method comprising;
sending a content to be displayed by the client from the server to the client;
receiving from the client, an input information by the user to the client during the content is displayed;
analyzing the input information by the user received from the client;
changing the content to be displayed by the client based on the result of the analysis, wherein the changed content includes 3D objects;
extracting by the server color information, alpha information, and geometry information from the 3D objects;
simplifying by the server the geometry information by converting the geometry information to information of vertex of triangles;
encoding by the server the color information, the alpha information, and the simplified geometry information as a stream; and
sending the changed content as the stream to the client.

2. The method according to claim 1, wherein the content is a content in a space of three or more dimensions, a content in augmented reality, virtual reality, mixed reality, alternative reality, or extended reality.

3. The method according to claim 1, wherein the content is generated in two dimensions, three dimensions, or four or more dimensions.

4. The method according to claim 1, wherein the input information by the user includes time information when the input is made,
the server accumulates and analyzes the input information by the user and the information on the input time.

5. The method according to claim 1, wherein the input information by the user includes an information on the time when the input was made and an information on an event generated by the input.

6. The method according to claim 5, wherein the server changes the content to be displayed by the client based on the result of the analysis by analyzing the input information by the user and the information of the event.

7. A non-transitory computer-readable recording medium including instructions for executing the method according to claim 1 by a processor.

8. A server configured to analyze an input by a user received by a client, on the server, the server comprising:
one or more processors and memory,
wherein the server is configured to:
send the content to be displayed by the client from the server to the client,
receive a user's input information for the client displaying the content from the client;
analyze the user's input information by the user received from the client;
change the content to be displayed on the client based on the result of the analysis, wherein the changed content includes 3D objects;
extract color information, alpha information, and geometry information from the 3D objects;
simplify the geometry information by converting the geometry information to information of vertex of triangles;

encode the color information, the alpha information, and the simplified geometry information as a stream; and send the changed content as the steam to the client.

9. A method to display content on a client, the method comprising;

receiving from the server, the content to be displayed by the client;

sending a user's input information to the client during displaying the content to the server;

receiving the changed content as a stream based on the result of analysis on the server for the user's input information, wherein the stream includes encoded color information, alpha information, and simplified geometry information of 3D objects, and the simplified geometry information includes information of vertex of triangles;

decoding the stream and reconstructing the changed content from the decoded stream; and displaying the changed content on the client.

10. A non-transitory computer-readable recording medium including instructions for executing the method according to claim 9 by a processor.

11. A client configured to display content, the client comprising:

one or more processors and a memory;

wherein the client is configured to:

receive the content to be displayed by the client from the server;

send a user's input information for the client during displaying the content to the server;

receive the changed content as a stream based on the result of analysis on the server for the user's input information, wherein the stream includes encoded color information, alpha information, and simplified geometry information of 3D objects, and the simplified geometry information includes information of vertex of triangles;

decode the stream and reconstruct the changed content from the decoded stream; and display the changed content on the client.

* * * * *